US010171685B2

(12) United States Patent
Yamada et al.

(10) Patent No.: US 10,171,685 B2
(45) Date of Patent: Jan. 1, 2019

(54) SERVICE PROVIDING SYSTEM, INFORMATION PROCESSING METHOD, AND NON-TRANSITORY RECORDING MEDIUM

(71) Applicants: Satoru Yamada, Kanagawa (JP); Ato Araki, Tokyo (JP); Rina Takahashi, Kanagawa (JP)

(72) Inventors: Satoru Yamada, Kanagawa (JP); Ato Araki, Tokyo (JP); Rina Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/373,838

(22) Filed: Dec. 9, 2016

(65) Prior Publication Data

US 2017/0171399 A1 Jun. 15, 2017

(30) Foreign Application Priority Data

Dec. 15, 2015 (JP) .................................. 2015-243792
Oct. 31, 2016 (JP) .................................. 2016-213098

(51) Int. Cl.
*H04N 1/04* (2006.01)
*H04N 1/00* (2006.01)
(Continued)

(52) U.S. Cl.
CPC ......... *H04N 1/0023* (2013.01); *G06F 3/1207* (2013.01); *G06F 3/1222* (2013.01);
(Continued)

(58) Field of Classification Search
CPC ...... G06F 3/1288; G06F 3/126; G06F 3/1286; G06F 3/1296; G06F 3/1259;
(Continued)

(56) References Cited

U.S. PATENT DOCUMENTS 6,654,137 B1 * 11/2003 Yagita .................. G06K 15/002
358/1.1
7,092,119 B1 * 8/2006 Hinds .................. H04N 1/6033
358/1.11
(Continued)

FOREIGN PATENT DOCUMENTS

JP 2013-242848 12/2013
JP 2016-111702 6/2016

OTHER PUBLICATIONS

Extended European Search Report for 16202759.3 dated May 18, 2017.

*Primary Examiner* — Negussie Worku
(74) *Attorney, Agent, or Firm* — IPUSA, PLLC

(57) ABSTRACT

A service providing system is for providing a service that is in cooperation with a printing service that is provided by an external printing system. The service providing system includes a job obtaining unit configured, when receiving from the printing system a notification representing that a print job is created by the printing service, to obtain the print job from the printing system; a job managing unit configured to store, in a job storage unit, the print job obtained by the job obtaining unit; and a job transmitting unit configured to transmit the print job stored in the job storage unit in response to a print job request from an image forming apparatus that is coupled to the service providing system via a network.

20 Claims, 21 Drawing Sheets

(51) Int. Cl.
*G06F 3/12* (2006.01)
*H04N 1/32* (2006.01)

(52) U.S. Cl.
CPC .......... *G06F 3/1238* (2013.01); *G06F 3/1267* (2013.01); *G06F 3/1268* (2013.01); *G06F 3/1287* (2013.01); *G06F 3/1288* (2013.01); *H04N 1/00344* (2013.01); *H04N 1/32117* (2013.01); *G06F 3/122* (2013.01); *G06F 3/1203* (2013.01); *H04N 2201/0094* (2013.01); *H04N 2201/3202* (2013.01); *H04N 2201/3204* (2013.01); *H04N 2201/3221* (2013.01); *H04N 2201/3232* (2013.01)

(58) Field of Classification Search
CPC .............. G06F 3/1287; H04N 1/00204; H04N 1/00631; H04N 1/00644; H04N 1/2338; H04N 1/2392; H04N 1/00244; H04N 1/00127; H04N 1/3255
USPC ......... 358/1.15, 1.13, 1.14, 1.16, 1.18, 1.12, 358/402
See application file for complete search history.

(56) References Cited

U.S. PATENT DOCUMENTS

| | | | | |
|---|---|---|---|---|
| 7,411,690 B2* | 8/2008 | Tsukada | .................. | G06F 3/122 358/1.15 |
| 8,854,669 B1* | 10/2014 | Jazayeri | ................ | G06F 3/1204 358/1.15 |
| 9,606,760 B2* | 3/2017 | Tanaka | .................. | G06F 3/1267 |
| 2002/0122201 A1 | 9/2002 | Haraguchi et al. | | |
| 2005/0068572 A1* | 3/2005 | Hart | .................... | H04N 1/00127 358/1.15 |
| 2005/0105129 A1* | 5/2005 | Takahashi | .......... | H04N 1/00204 358/1.15 |
| 2006/0238803 A1* | 10/2006 | Kuroshima | ............. | G06F 3/121 358/1.15 |
| 2007/0019224 A1* | 1/2007 | Okada | .................. | G06F 3/1208 358/1.13 |
| 2007/0109586 A1* | 5/2007 | Yamada | .................. | G06F 3/121 358/1.14 |
| 2007/0279668 A1* | 12/2007 | Czyszczewski | ...... | G06F 3/1204 358/1.14 |
| 2008/0030772 A1* | 2/2008 | Shirai | .................... | G06F 3/1204 358/1.15 |
| 2010/0039665 A1* | 2/2010 | Tsukada | .................. | B41J 11/66 358/1.15 |
| 2011/0282987 A1* | 11/2011 | Uchida | .................. | G06F 3/1211 709/224 |
| 2012/0314250 A1* | 12/2012 | Ito | ...................... | H04N 1/00127 358/1.15 |
| 2013/0194633 A1 | 8/2013 | Takatsu et al. | | |
| 2014/0029041 A1* | 1/2014 | Okubo | ................. | H04N 1/4433 358/1.14 |
| 2015/0212766 A1* | 7/2015 | Mutsuno | ............. | G03G 15/553 358/1.14 |
| 2016/0165076 A1 | 6/2016 | Tokiwa et al. | | |

* cited by examiner

FIG.6

| USER ID | ACCOUNT ID |
|---|---|
| Yamada | yamada@aaa.com |
| Tanaka | tanaka@aaa.com |
| Suzuki | suzuki1@aaa.com<br>suzuki2@aaa.com |
| ... ||

To : yamada@aaa.com
From : system@ZZZ.co.jp
Subject : TEMPORARY CODE

INPUT THE FOLLOWING CODE
IN IMAGE FORMING APPARATUS
TO PERFORM PRINTING.

3789243

SERVICE PROVIDING SYSTEM, INFORMATION PROCESSING METHOD, AND NON-TRANSITORY RECORDING MEDIUM

CROSS-REFERENCE TO RELATED APPLICATIONS

The present application claims priority under 35 U.S.C. § 119 to Japanese Patent Application No. 2015-243792 filed on Dec. 15, 2015 and Japanese Patent Application No. 2016-213098 filed on Oct. 31, 2016, the contents of which are incorporated herein by reference in their entirety.

BACKGROUND OF THE INVENTION

1. Field of the Invention

The disclosures herein generally relate to a service providing system, an information processing method, and a non-transitory recording medium.

2. Description of the Related Art

Recently, various services are provided according to advance in technology of cloud computing and the like. For example, a technique, in which an image forming apparatus cooperates with a cloud service, is known in the related art. In the technique, printing target data such as document data, transmitted to the cloud service from a personal computer (PC), a smartphone, or the like, is printed by the image forming apparatus.

For example, Japanese Unexamined Patent Application Publication No. 2013-242848 discloses a printing system that accumulates print jobs in an information processing apparatus such as a print server. The printing system uses an image forming apparatus to execute a print job selected from a list of the print jobs by a user.

SUMMARY OF THE INVENTION

It is a general object of at least one embodiment of the present disclosure to provide a service providing system, an information processing method, and a non-transitory recording medium that substantially obviate one or more problems caused by the limitations and disadvantages of the related art.

According to one aspect of the present disclosure, there is provided a service providing system for providing a service that is in cooperation with a printing service that is provided by an external printing system. The service providing system includes a job obtaining unit configured, when receiving from the printing system a notification representing that a print job is created by the printing service, to obtain the print job from the printing system; a job managing unit configured to store, in a job storage unit, the print job obtained by the job obtaining unit; and a job transmitting unit configured to transmit the print job stored in the job storage unit in response to a print job request from an image forming apparatus that is coupled to the service providing system via a network.

BRIEF DESCRIPTION OF THE DRAWINGS

FIG. 6 is a table illustrating an example of a cooperation information table according to the first embodiment;

FIG. 10 is a diagram illustrating an example of a temporary code according to the first embodiment;

DESCRIPTION OF THE EMBODIMENTS

In the following, embodiments of the present disclosure will be described in detail with reference to the accompanying drawings. One embodiment of the present disclosure has an object to provide a printing service that is in cooperation with a cloud printing service.

First Embodiment

<System Configuration>

Figure 1:
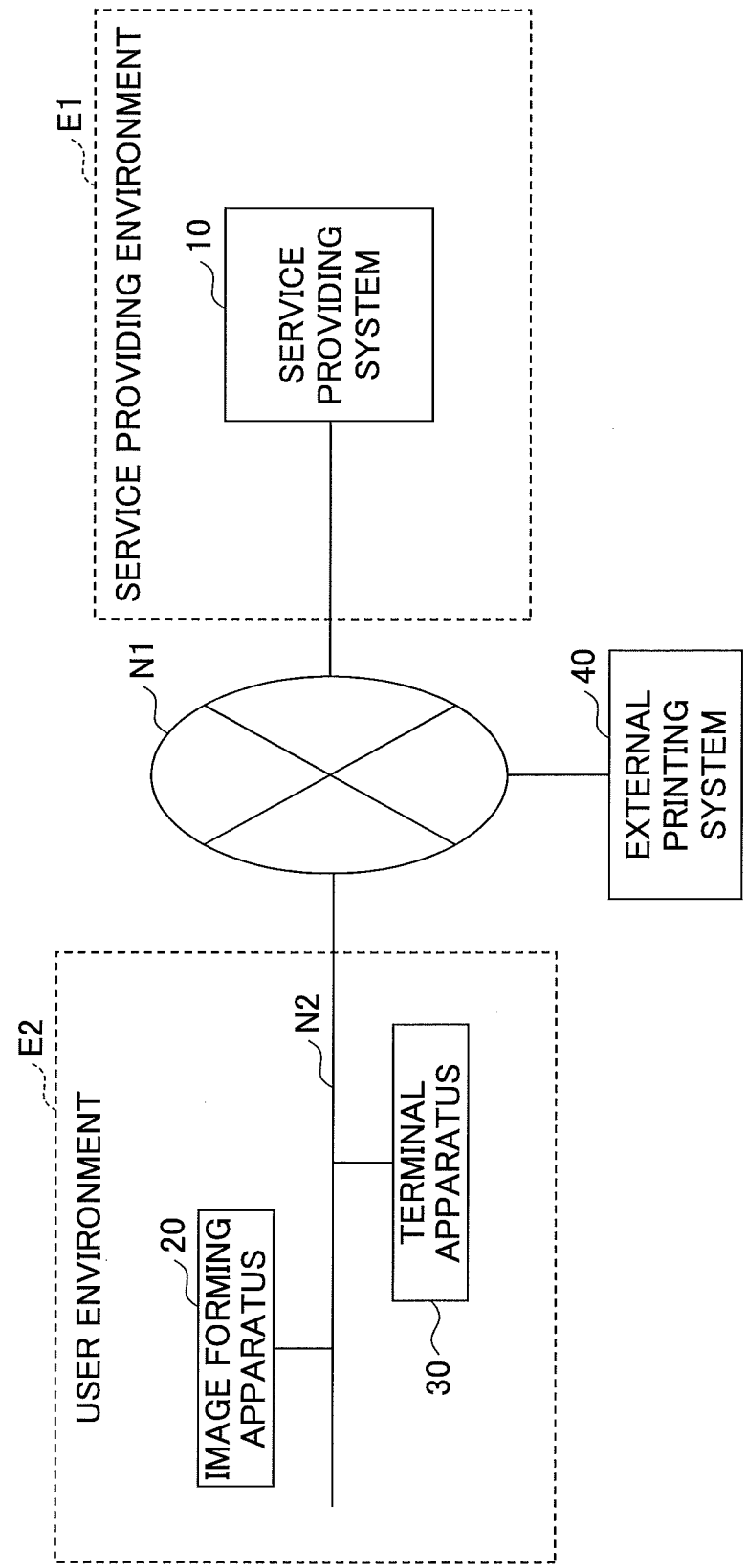
FIG. 1 is a block diagram illustrating an example of a configuration of an information processing system according to a first embodiment.

A system configuration of an information processing system 1 according to a first embodiment will be described with reference to FIG. 1. FIG. 1 is a block diagram illustrating an example of the system configuration of the information processing system 1 according to the first embodiment.

The information processing system 1 illustrated in FIG. 1 includes a service providing environment E1, a user environment E2, and an external printing system 40 that are coupled with each other in a communicative manner via a wide-area network N1 such as the INTERNET.

The service providing environment E1 is a system environment that provides, via the network N1, a predetermined service such as a cloud service that is in cooperation with an external service. Although the cloud service is described as a specific example of the external service in the first embodiment, the embodiment is not limited to this. For example, the embodiment may be applicable to a service provided by an application service provider (ASP) and various services that are provided through the network N1 such as a Web service.

The service providing environment E1 includes a service providing system 10 realized by one or more information processing apparatuses. The service providing system 10 provides the predetermined service via the network N1.

For example, the service providing system 10 provides a printing service (cloud cooperation printing service) that is in cooperation with a cloud service (cloud printing service) that is provided by the external printing system 40, which will be described later. The service providing system 10 according to the first embodiment provides the cloud cooperation printing service, which may be simply referred to as the "cloud cooperation printing" hereinafter.

Here, all or part of the service providing system 10 may be installed in the user environment E2. That is, the user environment E2 may include (contain) all or part of one or more information processing apparatuses that structure the service providing system 10.

The user environment E2 is a system environment for one or more users who use an image forming apparatus 20, for example. In the user environment E2, one or more image forming apparatuses 20 and one or more terminal apparatuses 30 are coupled in a communicative manner via a network N2 such as a Local Area Network (LAN), for example.

The image forming apparatus 20 according to the first embodiment is an apparatus that has a printing function. For example, the image forming apparatus 20 may be a Multi-function Peripheral (MFP) that has various functions including a copying function, a scanning function, a faxing (FAX) communication function, and the like in addition to the printing function.

The terminal apparatus 30 is an apparatus such as a personal computer (PC) and a smartphone that transmits, to the external printing system 40, a print request by the cloud printing service in response to a print instruction from the user.

The external printing system 40 is a computer system that provides the cloud printing service via the network N1. For example, the cloud printing service is a service to transmit, to an apparatus such as a printer registered in advance, a print job (a unit of a job to be executed by a computer) based on the print request transmitted from the terminal apparatus 30 and causes the apparatus to print (execute) the print job.

Here, the configuration of the information processing system 1 illustrated in FIG. 1 is an example. The information processing system 1 may have another configuration. For example, the user environment E2 does not have to include the terminal apparatus 30. Further, the terminal apparatus 30 may be coupled to the network N1.

Figure 2:
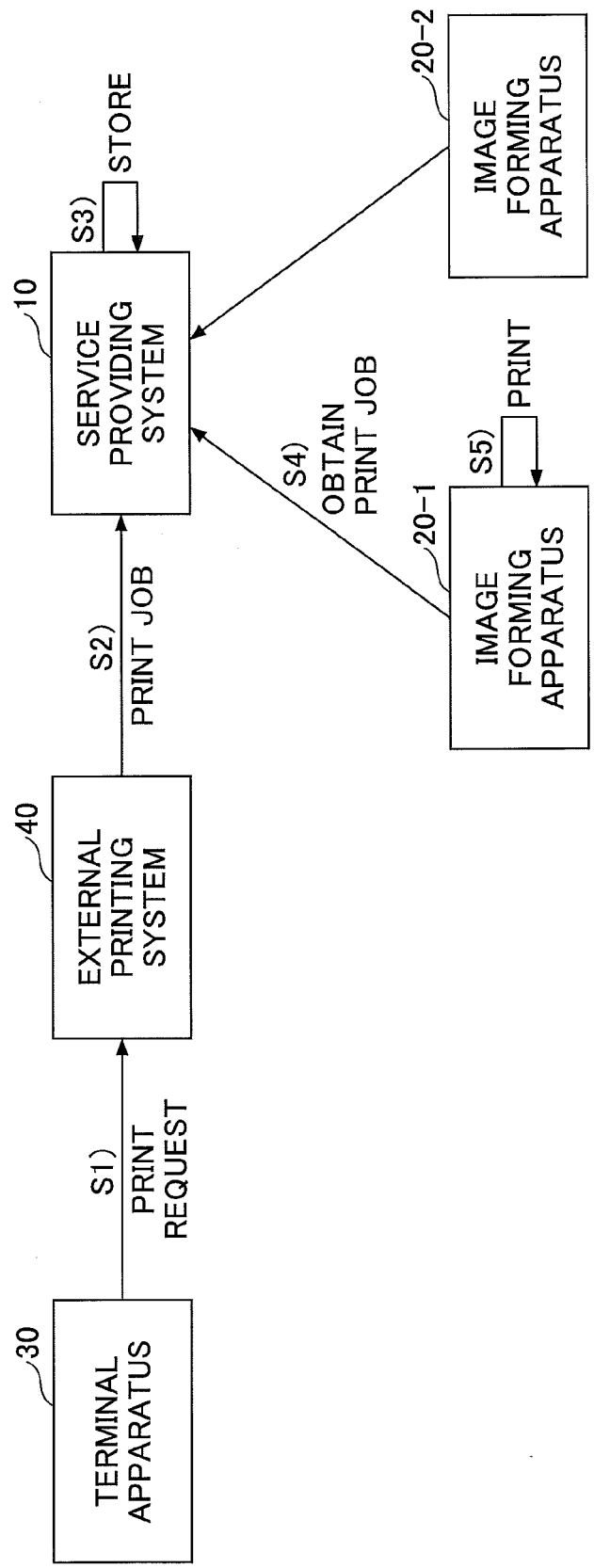
FIG. 2 is a diagram that describes cloud cooperation printing according to the first embodiment.

The cloud cooperation printing that is provided by the service providing system 10 according to the first embodiment will be described with reference to FIG. 2. FIG. 2 is a diagram that describes the cloud cooperation printing according to the first embodiment. In the descriptions of FIG. 2, it is assumed that registration and the like have been completed so that the user can use the cloud printing service.

First, the terminal apparatus 30 instructs printing in an application or the like installed in the terminal apparatus 30 to transmit, to the external printing system 40, a print request including printing target data and the like in step S1. Here, the printing target data is data to be printed. For example, the print targeting data may be document data, image data, or the like.

When receiving the print request from the terminal apparatus 30, the external printing system 40 transmits, to the service providing system 10 in step S2, a print job based on the received print request.

Next, when receiving the print job from the external printing system 40, the service providing system 10 stores the received print job in step S3. In this way, the service providing system 10 accumulates the print job received from the external printing system 40.

The image forming apparatus 20 obtains the print job accumulated in the service providing system 10 in response to an operation of the user in step S4. The image forming apparatus 20 prints the print data included in the print job in step S5. In this way, the user can cause the desired image forming apparatus 20 to perform the printing.

That is, for example, the user can use the image forming apparatus 20-1 to obtain the print job from the service providing system 10 to perform printing. The user can also use the image forming apparatus 20-2 to obtain the print job from the service providing system 10 to perform printing. In this way, according to the cloud cooperation printing that is provided by the service providing system 10 of the first embodiment, the user can use a desired image forming apparatus 20 to perform printing by the cloud printing service that is provided by the external printing system 40.

<Hardware Configuration>

Figure 3:
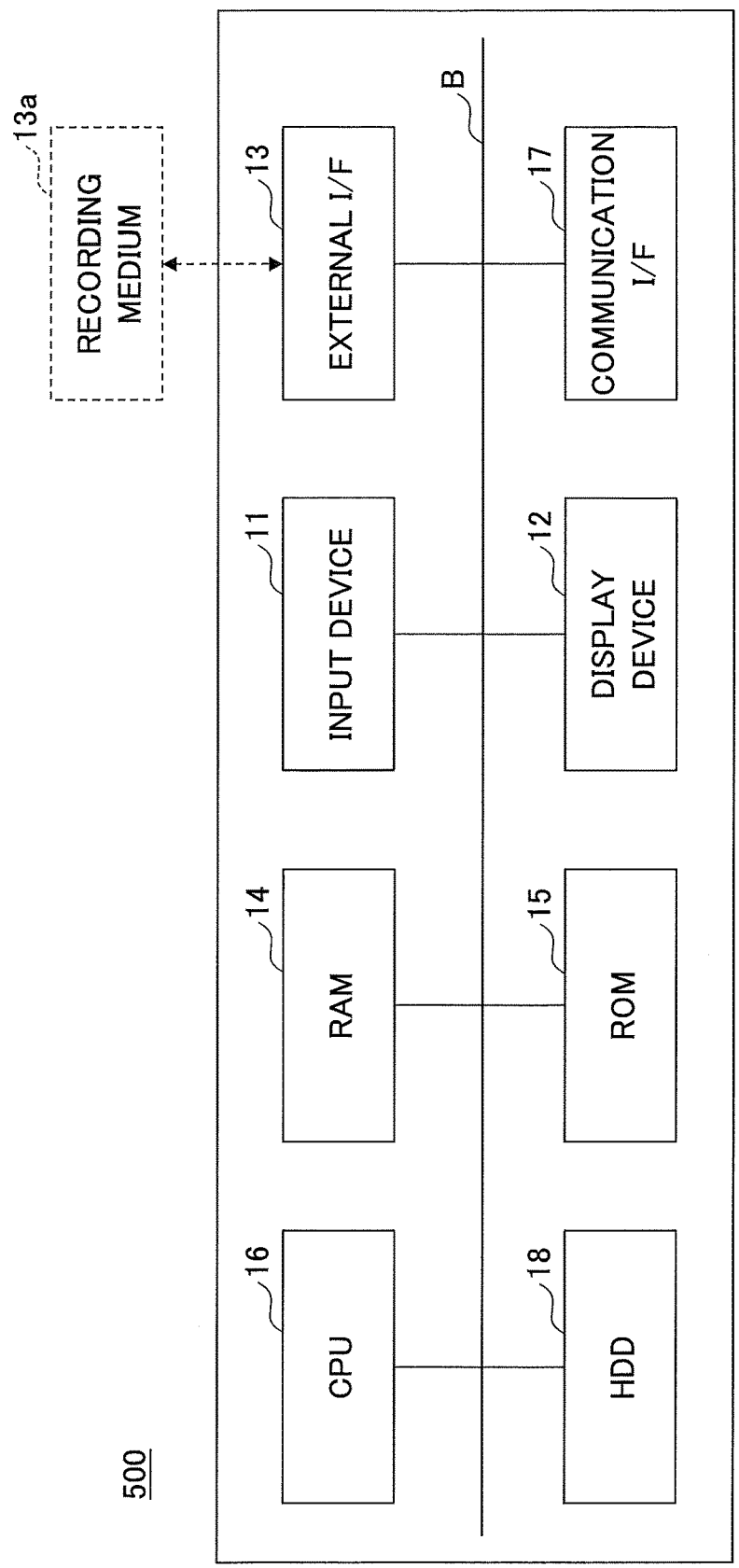
FIG. 3 is a block diagram illustrating an example of a hardware configuration of a computer according to the first embodiment.

A hardware configuration of the service providing system 10 according to the first embodiment will be described with reference to FIG. 3. FIG. 3 is a block diagram illustrating an example of the hardware configuration of a computer 500 according to the first embodiment.

One or more information processing apparatuses realizing the service providing system 10 according to the first embodiment are realized by the computer 500 having the hardware configuration illustrated in FIG. 3. Here, the terminal apparatus 30 is similarly realized by the computer 500 illustrated in FIG. 3.

The computer 500 illustrated in FIG. 3 includes an input device 11, a display device 12, an external I/F 13, and a Random Access Memory (RAM) 14. Further, the computer 500 includes a Read Only Memory (ROM) 15, a Central Processing Unit (CPU) 16, a communication I/F 17, and a Hard Disk Drive (HDD) 18. These hardware elements are coupled with each other via a bus B.

The input device 11 includes a keyboard, a mouse, a touch panel, and the like. The user can use the input device 11 to input various operation signals. The display device 12 includes a display or the like to display a processing result by the computer 500. Here, at least one of the input device 11 and the display device 12 may be coupled to the bus B to use only when the at least one of the input device 11 and the display device 12 are necessary.

The communication I/F 17 is an interface that couples the computer 500 to the network N1. With this configuration, the computer 500 can perform data communication via the communication I/F 17.

The HDD 18 is a non-volatile storage device that stores one or more programs and/or data. The programs and/or data stored in the HDD 18 may include an operating system (OS), which is basic software for controlling the entire computer 500, application software that provides various functions in the OS, and so on.

The computer 500 may use a drive device using a flash memory (e.g., a solid state drive (SSD)) as a memory medium instead of the HDD 18. Further, the HDD 18 manages the stored programs and/or data using a predetermined file system, a DB, and/or the like.

The external I/F 13 is an interface with an external device. The external device may be a recording medium 13a or the like. With this configuration, the computer 500 can read information (data) from the recording medium 13a and/or write information (data) on the recording medium 13a through the external I/F 13. The recording medium 13a may be a flexible disk, a CD, a DVD, an SD memory card, a USB memory, or the like.

The ROM 15 is a non-volatile semiconductor memory that can hold (store) programs and/or data even when a power source is powered off. The ROM 15 stores programs and/or data such as a basic input/output system (BIOS), an OS setup, and a network setup, which are executed when the computer 500 is activated. The RAM 14 is a volatile semiconductor memory that temporarily holds (stores) the programs and/or the data.

The CPU 16 reads, from the storage device such as the ROM 15 and the HDD 18, the program(s) and/or the data onto the RAM 14 to execute processing. The CPU 16 is an arithmetic device that actualizes control and functions of the entire computer 500 by executing the processing.

One or more information processing apparatuses actualizing the service providing system 10 according to the first embodiment have the hardware configuration of the computer 500 illustrated in FIG. 3 to actualize, various kinds of processing, which will be described later. Similarly, the terminal apparatus 30 according to the first embodiment has the hardware configuration of the computer 500 illustrated in FIG. 3 to actualize, various kinds of processing, which will be described later.

Figure 4:
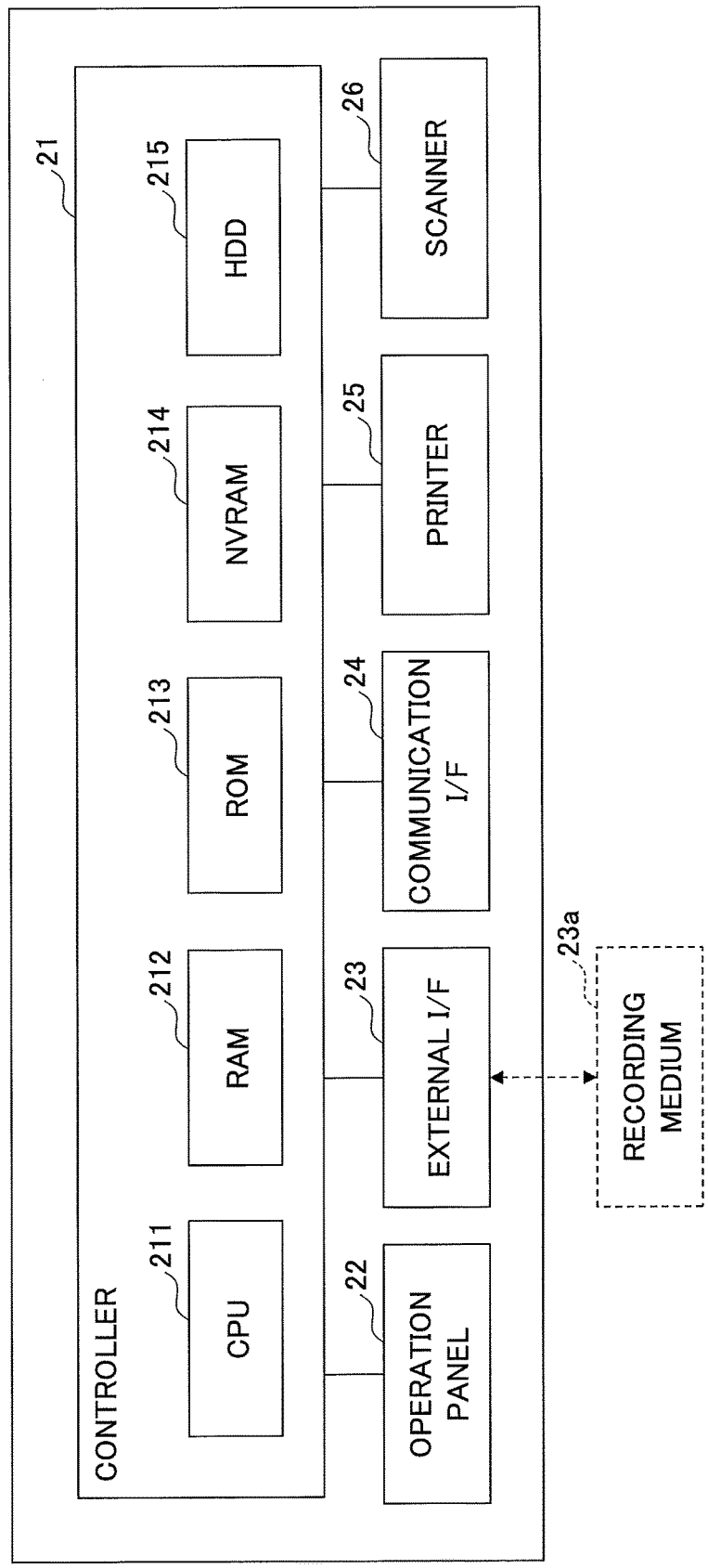
FIG. 4 is a block diagram illustrating an example of a hardware configuration of an image forming apparatus according to the first embodiment.

A hardware configuration of the image forming apparatus 20 according to the first embodiment will be described with reference to FIG. 4. FIG. 4 is a block diagram illustrating an example of a hardware configuration of the image forming apparatus 20 according to the first embodiment.

The image forming apparatus 20 illustrated in FIG. 4 includes a controller 21, an operation panel 22, an external I/F 23, a communication I/F 24, a printer 25, and a scanner 26. Further, the controller 21 includes a CPU 211, a RAM 212, a ROM 213, a NVRAM 214, and a HDD 215.

The ROM 213 stores various programs and/or data. The RAM 212 temporarily holds (stores) programs and/or data. The NVRAM 214 stores setting information (setup information) and the like, for example. The HDD 215 stores various programs and/or data.

The CPU 211 reads the program(s), the data, the setting information, or the like onto the RAM 212 from the ROM 213, the NVRAM 214, the HDD 215, or the like to execute the processing. Thereby, the CPU 211 actualizes control and functions of the entire image forming apparatus 20.

The operation panel 22 includes an input unit that receives input from a user and a display unit that displays data, an image, and/or the like. The external I/F 23 is an interface with an external device. A recording medium 23a or the like may be the external device. With this configuration, the image forming apparatus 20 can read and/or write information (data) from and/or on the recording medium 23a via the external I/F 23. For example, an IC card, a flexible disk, a CD, a DVD, an SD memory card, a USB memory or the like may be the recording medium 23a.

The communication I/F 24 is an interface that couples the image forming apparatus 20 to the network N2. With this configuration, the image forming apparatus 20 can perform data communication via the communication I/F 24.

The printer 25 is a printing device that prints print data on a conveyed object. Here, the conveyed object is not limited to a sheet (paper). For example, the conveyed object may be an OHP sheet, a plastic film, copper foil, or the like. The scanner 26 is a reading device that reads one or more documents to generate image data.

The image forming apparatus 20 according to the first embodiment has the hardware configuration illustrated in FIG. 4 to realize, various kinds of processing, which will be described later.

<Functional Configuration>

Figure 5:
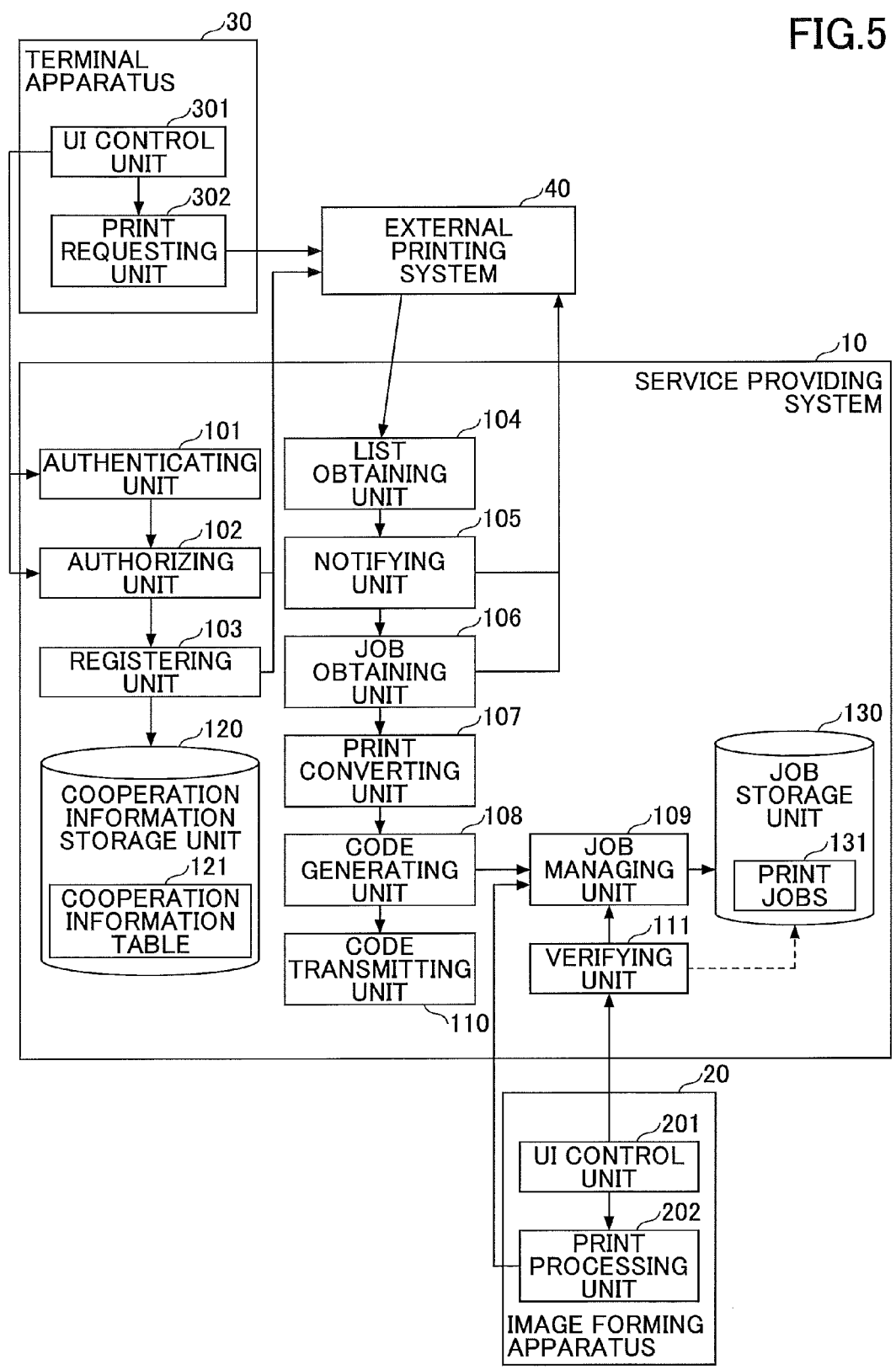
FIG. 5 is a block diagram illustrating an example of a functional configuration of the information processing system according to the first embodiment.

A functional configuration of the information processing system 1 according to the first embodiment will be described with reference to FIG. 5. FIG. 5 is a block diagram illustrating an example of the functional configuration of the information processing system 1 according to the first embodiment.

The terminal apparatus 30 includes a UI control unit 301 and a print requesting unit 302. These functional units (elements) are actualized by processing that one or more programs, installed in the terminal apparatus 30, cause the CPU 16 to execute.

The UI control unit 301 causes the display device 12 to display various screen. Further, the UI control unit 301 receives various operations that the user inputs to the input device 11.

The print requesting unit 302 transmits, to the external printing system 40, a print request including printing target data and the like in response to the operation of the user received by the UI control unit 301.

The image forming apparatus 20 includes a UI control unit 201 and a print processing unit 202. These functional units (elements) are actualized by processing that one or more programs, installed in the image forming apparatus 20, cause the CPU 211 to execute.

The UI control unit 201 causes the operation panel 22 to display various screen. Further, the UI control unit 201 receives various operations that the user inputs to the various screens displayed on the operation panel 22.

The print processing unit 202 causes the printer 25 to print the print data included in the print job obtained from the service providing system 10.

The service providing system 10 includes an authenticating unit 101, an authorizing unit 102, a registering unit 103, a list obtaining unit 104, a notifying unit 105, and a job obtaining unit 106. Further, the service providing system 10 includes a print converting unit 107, a code generating unit 108, a job managing unit 109, a code transmitting unit 110, and a verifying unit 111. These functional units (elements)

are actualized by processing that one or more programs, installed in the service providing system 10, cause the CPU 16 to execute.

Moreover, the service providing system 10 includes a cooperation information storage unit 120 and a job storage unit 130. The HDD 18 may be used to actualize these storage units. A storage device or the like that is coupled to the service providing system 10 via the network may be used to realize at least one of the cooperation information storage unit 120 and the job storage unit 130.

The authenticating unit 101 performs authentication processing for authenticating the user. For example, the authenticating unit 101 performs the authentication processing in a case where the user uses the terminal apparatus 30 to logs in to the service providing system 10.

The authorizing unit 102 performs authorization processing in conformity with OAuth between the external printing system 40 and the service providing system 10. For example, when the user uses the terminal apparatus 30 to perform use registration for using the cloud cooperation printing, the authorizing unit 102 performs the authorization processing for performing the registration for using the cloud printing service.

When the authorization processing is performed by the authorizing unit 102, the registering unit 103 performs, on the external printing system 40, the registration for using the cloud printing service.

When performing the registration for using the cloud printing service, the registering unit 103 causes the cooperation information table 121 to store a user ID, which is an example of identification information for identifying a user in the service providing system 10, and an account ID, which is an example of identification information for identifying the user in the external printing system 40, in association with each other. In this way, the user ID in the service providing system 10 is associated with the account ID in the external printing system 40 to perform the registration for using the cloud cooperation service.

Here, the account ID is information for identifying the user in external printing system 40. For example, an e-mail address may be the account ID. However, the account ID is not limited to the e-mail address. For example, a telephone number, an arbitrary character string configured with alphanumeric characters, or the like may be used.

The list obtaining unit 104 obtains, in response to a notification from the external printing system 40, a list of print jobs (referred to as "job list" hereinafter) from the external printing system 40. For example, the job list includes, for each job, a job ID for identifying a print job uniquely and status of the print job (such as "printed" and "unprocessed (unexecuted)", for example).

The notifying unit 105 notifies the external printing system 40 of a state of the service providing system 10 (such as "in processing" and "being able to print", for example).

The job obtaining unit 106 transmits, to the external printing system 40, an obtaining request for obtaining at least one print job whose status is "unprocessed" among the job list obtained by the list obtaining unit 104. In other words, the job obtaining unit 106 obtains at least one unexecuted print job listed in the job list.

The print converting unit 107 converts, as needed, the print data included in the print job obtained by the job obtaining unit 106 to data having a data format that can be printed by the image forming apparatus 20.

The code generating unit 108 generates a temporary code for causing the image forming apparatus 20 to execute the print job. Here, the code generating unit 108 generates the temporary code, which is not overlapped with temporary codes that are stored in the job storage unit 130 in association with the print jobs 131, which will be described later.

The job managing unit 109 causes the job storage unit 130 to store the print job obtained by the job obtaining unit 106 or the print job having print data converted by the print converting unit 107 in association with the temporary code generated by the code generating unit 108.

The code transmitting unit 110 transmits the temporary code, generated by the code generating unit 108, to a predetermined e-mail address, for example. In other words, the code transmitting unit 110 serves as an e-mail transmitting unit that transmits the temporary code to an e-mail address designated in advance.

The verifying unit 111 verifies validity (effectiveness) of the temporary code input for executing the print job in the image forming apparatus 20. That is, the verifying unit 111 verifies whether the print job 131 associated with the temporary code input in the image forming apparatus 20 is stored in the job storage unit 130.

The job storage unit 130 stores the print job 131 associated with the temporary code. Further, the print job 131 is associated with a job state that represents an execution state of the print job 131. For example, the job state may be "unexecuted", "in executing", "interrupted", and "executed". It should be noted that the job storage unit 130 can store a plurality of print jobs 131 each of which is associated with a temporary code and a job state.

Further, the print job may be associated with a user ID of a user of the terminal apparatus 30 that transmits a print request.

The cooperation information storage unit 120 stores a cooperation information table 121. A data configuration of the cooperation information table 121 will be described with reference to FIG. 6. FIG. 6 is a table illustrating an example of the cooperation information table 121 according to the first embodiment.

The cooperation information table 121 illustrated in FIG. 6 includes user IDs and account IDs as data items. As described above, the user ID is identification information for identifying the user in the service providing system 10. The account ID is identification information for identifying the user in the external printing system 40. The user IDs are associated with the respective account IDs in the service providing system 10. Here, a plurality of account IDs may be associated with one user ID in the cooperation information table 121.

<Details of Processing>

Details of processing of the information processing system 1 according to the first embodiment will be described.

<<Processing of Use Registration>>

Figure 7:
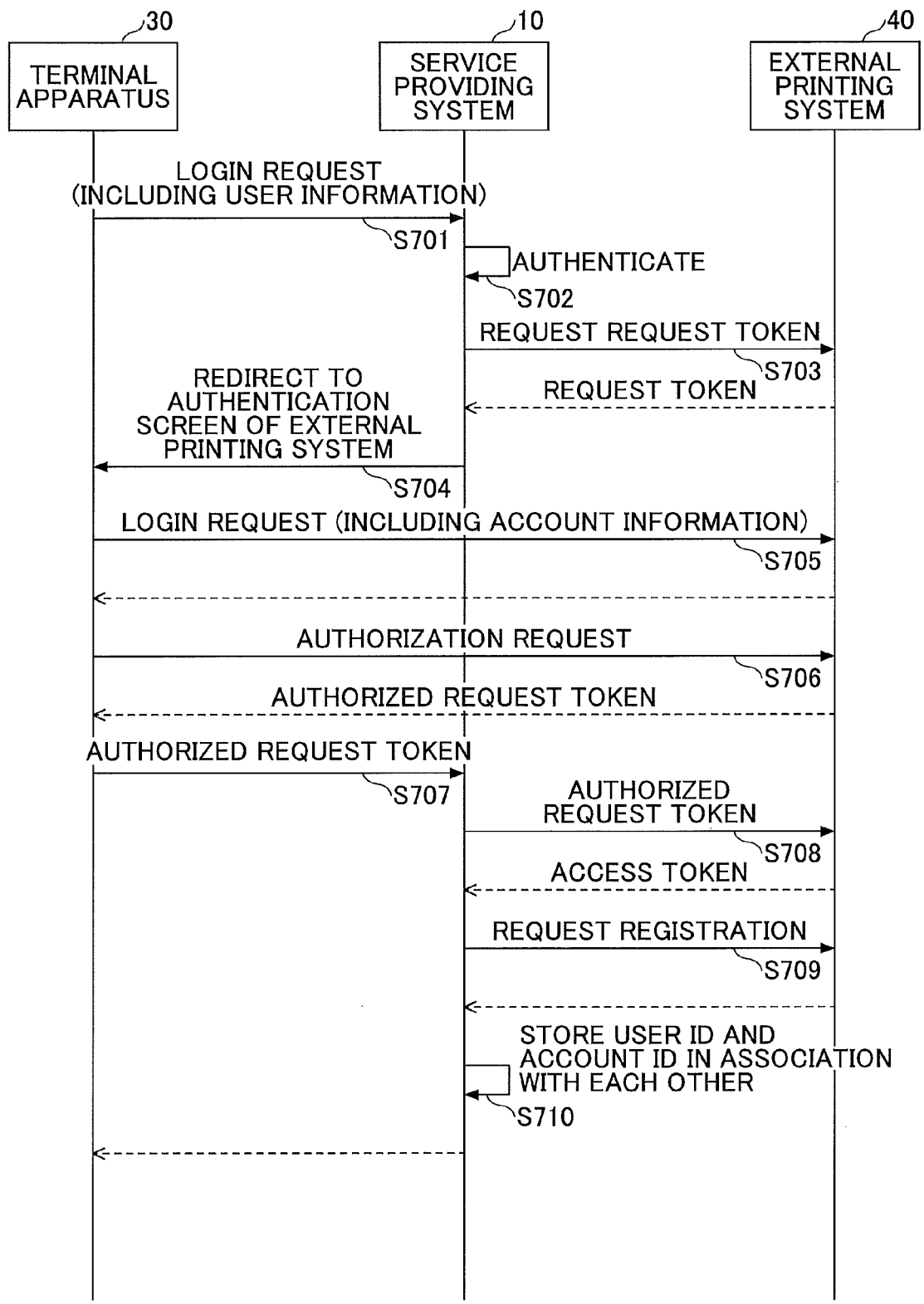
FIG. 7 is a sequence chart illustrating an example of processing of use registration according to the first embodiment.

Processing of use registration in which the user uses the terminal apparatus 30 and performs registration for using the cloud cooperation printing will be described with reference to FIG. 7. FIG. 7 is a sequence chart illustrating an example of processing of use registration according to the first embodiment. Here, it is assumed that the user has obtained the user ID of the service providing system 10 and the account ID of the external printing system 40 in advance.

In the following, a set (combination) of a user ID and a password with respect to the user ID is referred to as "user information", and a set (combination) of an account ID and a password with respect to the account ID is referred to as "account information". In other words, the user information is authentication information with respect to the service providing system 10 and the account information is authentication information with respect to the external printing system 40.

Figure 8:
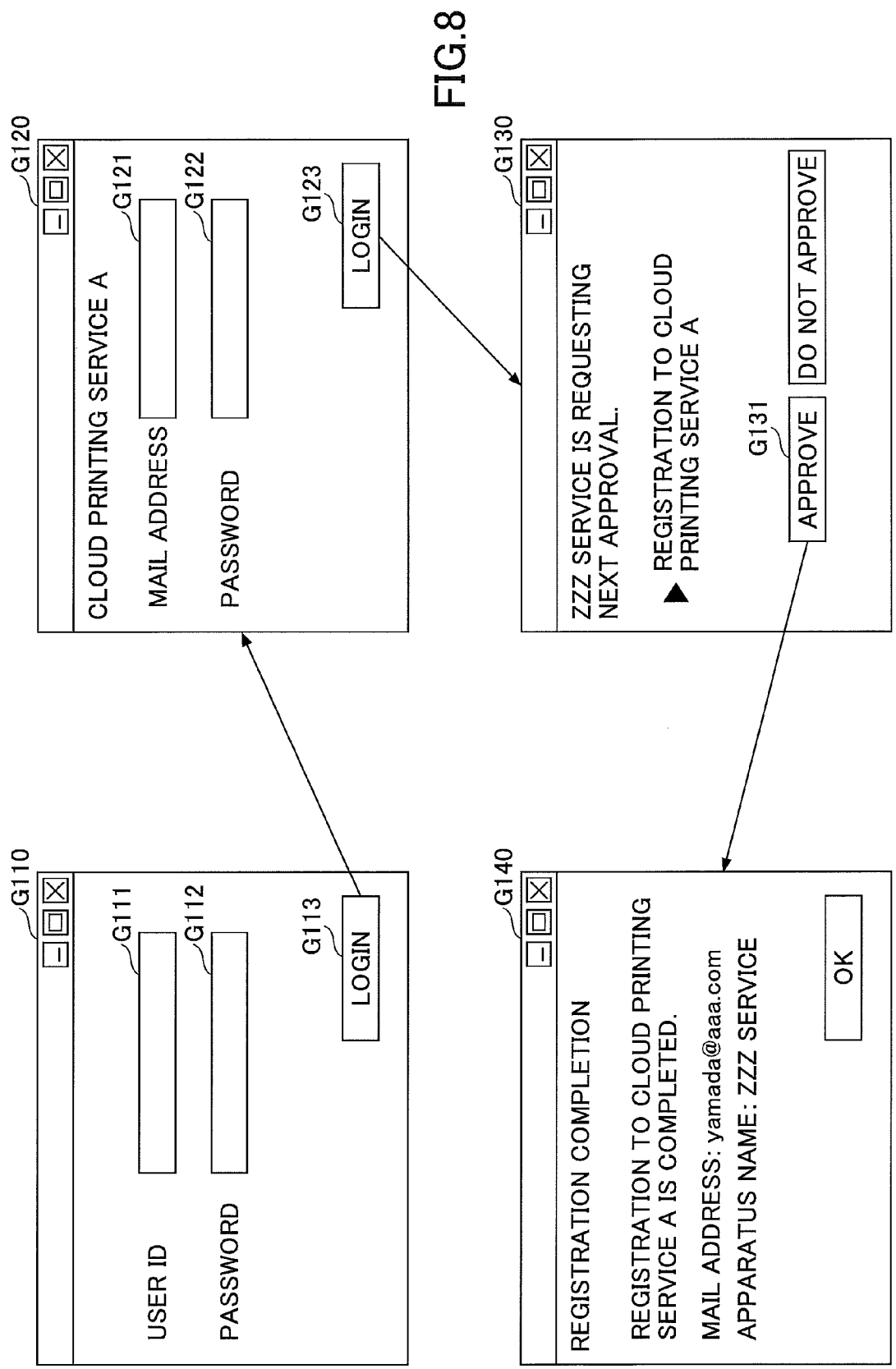
FIG. 8 is a screen transition diagram of an example of a terminal apparatus in the processing of the use registration according to the first embodiment.

FIG. 8 is a screen transition diagram of an example of the terminal apparatus 30 in the processing of the use registration according to the first embodiment. First, a registration start screen G110 is displayed on the terminal apparatus 30 by the UI control unit 301 as illustrated in FIG. 8, for example. At this time, when a login button G113 is pushed after a user ID and a password are respectively input in a user ID input field G111 and a password input field G112, the UI control unit 301 transmits a login request to the service providing system 10 in step S701. Here, the transmitted login request includes the user ID and the password entered in the user ID input field G111 and the password input field G112. That is, the login request includes user information. The user information may be issued by the service providing system 10.

When receiving the login request, the authenticating unit 101 of the service providing system 10 performs authentication processing based on the user information included in the received login request in step S702. That is, the authenticating unit 101 determines whether the user information included in the login request matches user information registered in advance, to perform the authentication processing, for example.

In a case where a processing result of the authentication processing by the authenticating unit 101 is successful, the authorizing unit 102 of the service providing system 10 transmits, to the external printing system 40 in step S703, a request for a request token that is in conformity with OAuth. Then, the external printing system 40 transmits (returns) the request token to the service providing system 10.

In a case where a processing result of the authentication processing by the authenticating unit 101 is unsuccessful, the authenticating unit 101 transmits, to the terminal apparatus 30, a notification that represents that the authentication fails.

Next, when receiving the request token, the authorizing unit 102 of the service providing system 10 transmits a Uniform Resource Locator (URL) of an authentication screen of the external printing system 40 to the terminal apparatus 30 and redirects the terminal apparatus 30 in step S704. Thus, an authentication screen G120 of the external printing system 40 is displayed on the terminal apparatus 30 by the UI control unit 301 as illustrated in FIG. 8, for example.

At this time, when a login button G123 is pushed after an account ID and a password are respectively input in an account ID input field G121 and a password input field G122, the UI control unit 301 transmits a login request to the external printing system 40 in step S705. Here, the transmitted login request includes the account ID (e-mail address) and the password entered in the account ID input field G121 and the password input field G122. That is, the login request includes account information. The account information may be for using the printing service.

Then, the authentication processing is performed based on the login request in the external printing system 40. In a case where a processing result of the authentication processing is successful, the external printing system 40 causes the terminal apparatus 30 to display an authorization confirmation screen G130 as illustrated in FIG. 8, for example.

When an authorization button G131 is pushed at this time, the UI control unit 301 transmits an authorization request to the external printing system 40 in step S706. Then, the external printing system 40 transmits (returns) the authorized request token to the terminal apparatus 30.

When receiving the authorized request token form the external printing system 40, the UI control unit 301 of the terminal apparatus 30 transmits the received authorized request token to the service providing system 10 in step S707.

When receiving the authorized request token, the authorizing unit 102 of the service providing system 10 transmits the received authorized request token to the external printing system 40 in step S708. Then, the external printing system 40 transmits (returns) an access token to the service providing system 10. In this way, the authorization processing is completed so that the service providing system 10 performs, on the external printing system 40, the registration for using the cloud printing service which.

The registering unit 103 of the service providing system 10 uses the access token obtained in step S708 to perform the registration for using the cloud printing service in step S709. At this time, the registering unit 103 registers the service providing system 10 as an apparatus such as a printer that uses the cloud printing service. That is, the registering unit 103 designates a virtual printer as the apparatus, which uses the cloud printing service, to perform the use registration.

If it is required to register information on performance (whether the apparatus can perform double face printing, and whether the apparatus can perform color printing, for example) of the apparatus, which uses the cloud printing service, in the external printing system 40, information on performance common in typical printers may be registered as the information on performance of the virtual printer.

Next, the registering unit 103 of the service providing system 10 causes the cooperation information table 121 to store the user ID and the account ID in association with each other in step S710. That is, the registering unit 103 stores, in the cooperation information table 121, the user ID entered in the user ID input field G111 of the registration start screen G110 and the account ID entered in the account ID input field G121 of the authentication screen G120 of the external printing system 40 in association with each other. In other words, in response to the use request from the terminal apparatus 30 or the image forming apparatus 20, the registering unit 103, which serves as a use registering unit, stores, in the cooperation information table 121 as a use information storage unit, the user information, included in the use request, and the account information, input in the screen displayed on the terminal apparatus 30 or the image forming apparatus 20 by the printing service, in association with each other. Then, the service providing system 10 causes the terminal apparatus 30 to display a registration completion screen G140 as illustrated in FIG. 8, for example.

As described above, the use registration is completed so that the user can use the cloud cooperation printing that is provided by the service providing system 10 according to the first embodiment. Here, if the user who logs in step S701 has already performed the registration for using the cloud cooperation printing (that is, the user ID has been stored in the cooperation information table 121), a screen for causing (prompting) the user to confirm whether to perform additional registration may be displayed.

<<Processing of Accumulating Print Job>>

Figure 9:
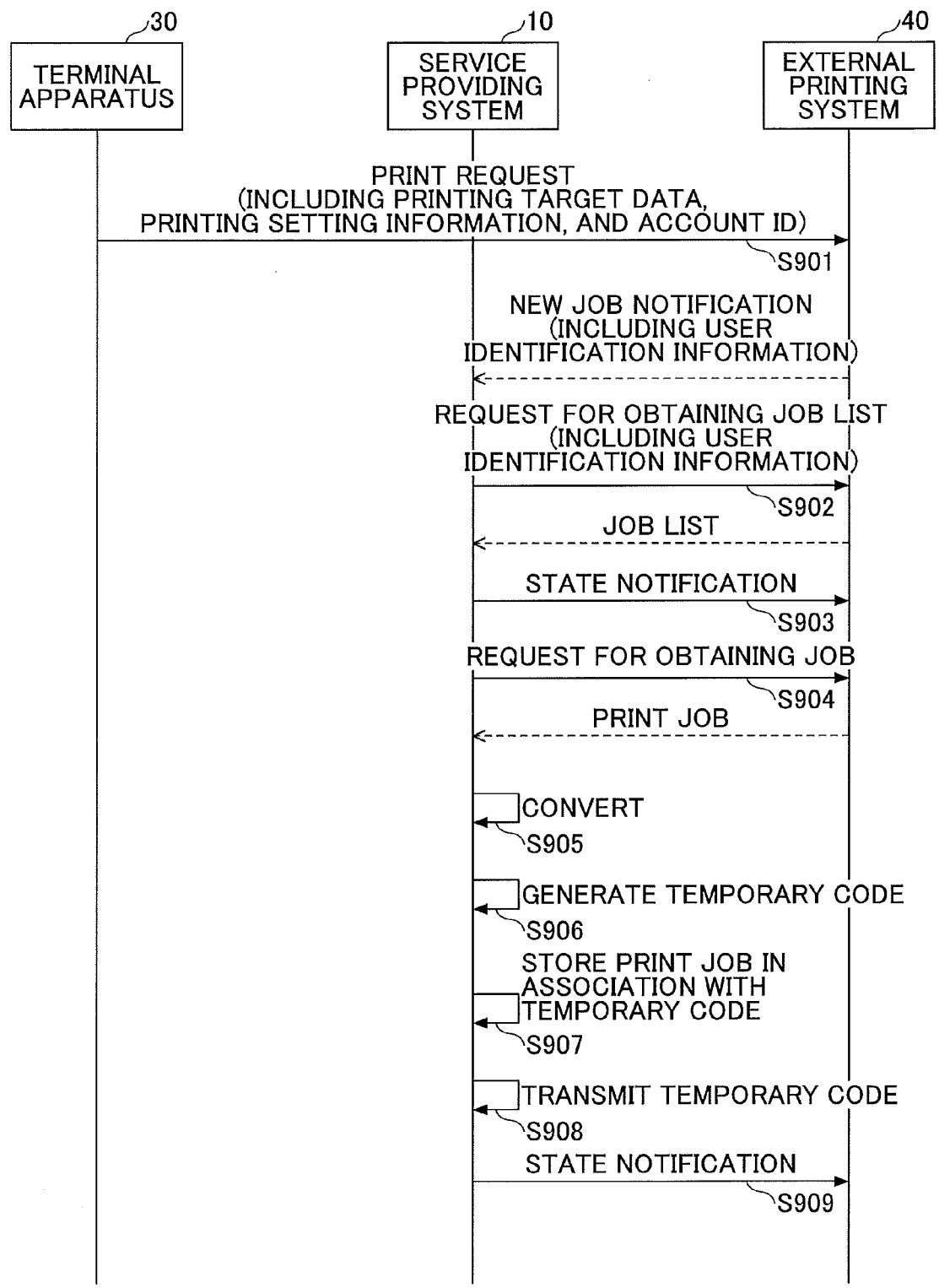
FIG. 9 is a sequence chart illustrating an example of processing of accumulating a print job according to the first embodiment.

Processing in which the user uses the terminal apparatus 30 to perform printing using the cloud printing service and to accumulate the print job in the service providing system 10 will be described with reference to FIG. 9. FIG. 9 is a sequence chart illustrating an example of processing of accumulating the print job according to the first embodiment.

First, when the UI control unit 301 receives a printing instruction from the user, the print requesting unit 302 of the terminal apparatus 30 transmits a print request to the external printing system 40 in step S901. Here, the print request includes printing target data such as document data that the user desires to print, print setting information (setup information) that represents printing settings, and the account ID of the user. Here, the printing target data is designated by the user.

When receiving the print request from the terminal apparatus 30, for example, the external printing system 40 creates a print job based on the received print request and transmits, to the service providing system 10, a new job notification that represents that the new print job is created. Here, the transmitted new job notification includes user identification information of the user that performs the printing instruction in step S901.

Arbitrary identification information for identifying the user who instructs the printing between the service providing system 10 and the external printing system 40 may be used as the user identification information. For example, the account ID may be used as the user identification information in the first embodiment.

When receiving the new job notification, the list obtaining unit 104 of the service providing system 10 transmits, to the external printing system 40 in step S902, an obtaining request for obtaining a job list that is a list of print jobs of the account ID corresponding to the user identification information, included in the received new job notification, to be identified. Then, the external printing system 40 transmits (returns) the job list to the service providing system 10. As described above, the job list includes a job ID of each print job and status of each print job, for example.

When receiving the job list, the notifying unit 105 of the service providing system 10 transmits, to the external printing system 40 in step S903, a state notification that represents a state of the service providing system 10. For example, the state of the service providing system 10 may be "in processing", "being able to print", or the like. Here, the notifying unit 105 may transmit, to the external printing system 40, the state notification that represents "in processing", for example.

Next, the job obtaining unit 106 of the service providing system 10 transmits, to the external printing system 40 in step S904, an obtaining request for obtaining a print job whose status is "unprocessed" listed in the job list obtained in step S902. In response to the obtaining request, the external printing system 40 returns (transmits) the print job related to the obtaining request. In other words, when receiving from the external printing system 40 the notification (information) representing that a print job is created by the printing service, the job obtaining unit 106 obtains the print job from the external printing system 40.

If a plurality of print jobs whose status is "unprocessed" are present in the job list obtained in step S902, the job obtaining unit 106 transmits, to the external printing system 40 in step S904, an obtaining request for obtaining the plurality of unprocessed print jobs.

Next, the print converting unit 107 of the service providing system 10 converts in step S905 print data, included in the print job obtained by the job obtaining unit 106, to data having a data format that can be printed by the image forming apparatus 20. In a case where the print data, included in the print job obtained by the job obtaining unit 106, has a data format that can be printed by the image forming apparatus 20, the print converting unit 107 does not have to convert the data format.

Next, the code generating unit 108 of the service providing system 10 generates a temporary code in step S906 for causing the image forming apparatus 20 to execute the print job. For example, the temporary code becomes invalid when a predetermined time has passed.

Next, the job managing unit 109 of the service providing system 10 causes the job storage unit 130 to store the print job in association with the temporary code in step S907. In other words, the job managing unit 109 stores, in the job storage unit 130, the print job obtained by the job obtaining unit 106 in association with the temporary code, which is unique code information, generated by the code generating unit 108. In this way, the print job created by the cloud printing service is accumulated, in the service providing system 10 according to the first embodiment, in association with the temporary code uniquely.

Subsequently, the code transmitting unit 110 of the service providing system 10 transmits the temporary code generated by the code generating unit 108 by e-mail in step S908. For example, the code transmitting unit 110 may transmit the temporary code to an e-mail address (account ID) included in the print job.

Further, with reference to the cooperation information table 121, the code transmitting unit 110 may transmit, to the user of the user ID associated with the account ID included in the print job, the temporary code by e-mail. In addition, for example, in a case where the external printing system 40 can cause the terminal apparatus 30, which is a request source of the print request, to display the temporary code, the code transmitting unit 110 may transmit, to the external printing system 40, the temporary code to cause the terminal apparatus 30 to display the temporary code.

FIG. 10 is a diagram illustrating an example of the temporary code transmitted to the terminal apparatus 30 by e-mail. As illustrated in FIG. 10, the temporary code for executing the print job to perform printing by use of the image forming apparatus 20 is displayed in the body of e-mail on the terminal apparatus 30. Although the example of the temporary code is a number in the first embodiment, the temporary code is not limited to this. The temporary code may be a character string. The user may arbitrarily set the character string to be used. For example, the character string may be alphanumeric characters. The number of characters may be set by the user arbitrarily.

Next, the notifying unit 105 of the service providing system 10 transmits, to the external printing system 40 in step S909, a state notification that represents the state of the service providing system 10. Here, the notifying unit 105 transmits, to the external printing system 40, the state notification that represents "being able to print", for example. In this way, the service providing system 10 according to the first embodiment notifies the external printing system 40 that the service providing system 10 is "in processing" during a time period between obtaining the print job and transmitting the temporary code.

As described above, the print job(s) created by the cloud printing service that is provided by the external printing system 40 is accumulated in the service providing system 10 according to the first embodiment. Further, the service providing system 10 according to the first embodiment generates the temporary code for causing the image forming apparatus 20 to print the accumulated print job and notifies the user of the temporary code. Thus, as described later, the user can input the temporary code in the image forming apparatus 20 to execute the print job, associated with the input temporary code, to perform the printing.

<<Processing of Executing Printing>>

Processing in which the user inputs the temporary code to the image forming apparatus 20 and obtains the print job from the service providing system 10 to execute printing will be described.

Figure 11:
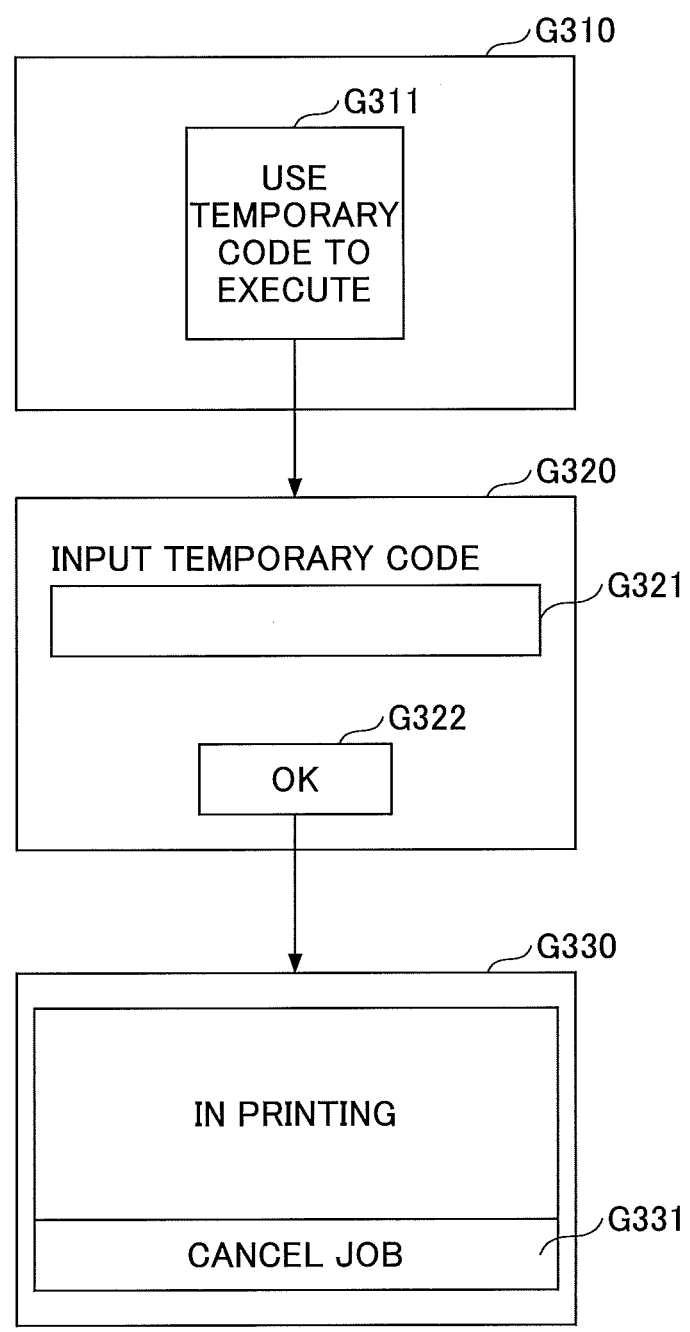
FIG. 11 is a screen transition diagram of an example of the image forming apparatus in processing of executing printing according to the first embodiment.

A screen transition on the operation panel 22 of the image forming apparatus 20 in the processing of executing printing will be described with reference to FIG. 11. FIG. 11 is a screen transition diagram of an example the image forming apparatus 20 in the processing of executing the printing according to the first embodiment.

As illustrated in FIG. 11, a top screen G310 includes an execution button G311 for executing the job by use of the temporary code. When the execution button G311 for executing the job by use of the temporary code is pushed by the user in the top screen G310, the UI control unit 201 displays a temporary code screen G320.

Figure 12:
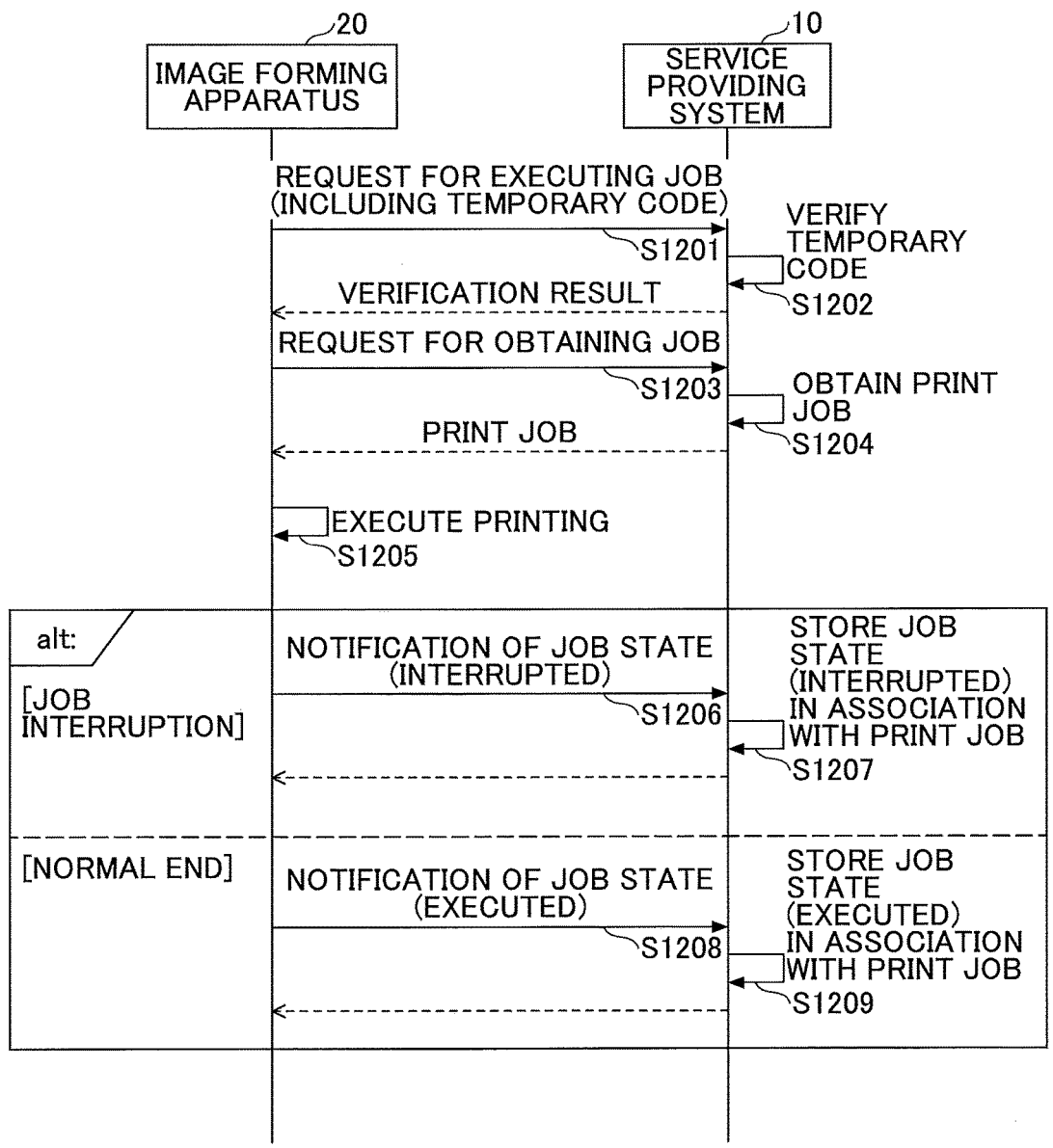
FIG. 12 is a sequence chart illustrating an example of the processing of executing the printing according to the first embodiment.

Then, when an OK button 6322 is pushed in the temporary code screen G320 after the temporary code is entered in a temporary code input field G321 by the user, the UI control unit 201 displays a screen G330 in printing and performs the processing of executing the printing according to a sequence illustrated in FIG. 12. FIG. 12 is a sequence chart illustrating an example of the processing of executing the printing according to the first embodiment. Here, when a cancel button G331 is pushed in the screen G330 in printing, the processing of executing the printing is cancelled.

The UI control unit 201 of the image forming apparatus 20 transmits, to the service providing system 10 in step S1201, a request for executing the job. The request for executing the job includes the temporary code input in the temporary code input field G321.

When receiving the request for executing the job, the verifying unit 111 of the service providing system 10 verifies in step S1202 validity of the temporary code included in the received request for executing the job. That is, the verifying unit 111 verifies whether the print job 131, associated with the temporary code included in the request for executing the job, is stored in the job storage unit 130. Then, the verifying unit 111 transmits (returns) a verification result to the image forming apparatus 20.

Here, the verifying unit 111 may verify whether a predetermined time has passed after the temporary code is generated, for example. That is the verifying unit 111 may verify whether an expiration date has passed. In a case where the predetermined time has not passed after the temporary code was generated, the verifying unit 111 may determine that the temporary code is valid. In a case where the predetermined time has passed after the temporary code was generated, the verifying unit 111 may determine that the temporary code is not valid.

In a case of receiving a verification result that represents the temporary code is valid (effective), the UI control unit 201 of the image forming apparatus 20 transmits, to the service providing system 10 in step S1203, a request for obtaining the job.

When receiving the request for obtaining the job, the job managing unit 109 of the service providing system 10 obtains, from the job storage unit 130 in step S1204, the print job 131 associated with the temporary code included in the request for executing the job received in step S1201. Then, the job managing unit 109 transmits (returns) the obtained print job 131 to the image forming apparatus 20. In other words, in response to the print job request designating the temporary code from the image forming apparatus 20 that is coupled to the service providing system 10, the job managing unit 109, which also serves as a job transmitting unit, transmits the print job, associated with the temporary code, stored in the print job storage unit 130 in a case where the verifying unit 111 determines that the temporary code designated by the print job request is valid.

Here, when receiving the request for obtaining the job, the job managing unit 109 verifies whether a job state of the print job 131 associated with the temporary code is "executed" or "in executing". In a case where the job state of the print job 131 associated with the temporary code is "executed" or "in executing", the job managing unit 109 does not transmit this print job 131 to the image forming apparatus 20. In other words, the job managing unit 109 transmits at least one print job of the print jobs stored in the job storage unit 130. The job execution state of the at least one print job is either an unexecuted state that represents the print job is unexecuted, or an interrupted state that represents execution of the print job is interrupted.

When receiving the print job 131, the print processing unit 202 of the image forming apparatus 20 executes the received print job 131 to print the print data included in the received print job 131 in step S1205. In this way, the print job 131 is executed in the image forming apparatus 20 to print the print data.

When starting to execute the print job 131 in the above step S1205, the print processing unit 202 of the image forming apparatus 20 transmits a notification (notification of the job state (in executing)) that represents the print job enters the executing state. Then, when receiving the notification of the job state (in executing), the job managing unit 109 of the service providing system 10 stores the print job 131 in the job storage unit 130 in association with the job state "in executing".

Thus, even when another image forming apparatus 20 transmits, to the service providing system 10, a request for executing the print job 131 (print job 131 whose job state is "in executing"), for example, the print job 131 is not returned to the other image forming apparatus 20. Accordingly, it is possible to prevent the same print job 131 from being executed by a plurality of image forming apparatuses 20 at the same time.

Here, in a case where the execution of the print job 131 in the above step S1205 is stopped (interrupted), the print processing unit 202 transmits, to the service providing system 10 in step S1206, a notification (notification of the job state (interrupted)) that represents that the print job 131 enters the interrupted state. For example, in a case where the user cancels the printing due to occurrence of a paper jam, run out of paper, or the like while the print job 131 is executed by the print processing unit 202, the execution of the print job 131 is stopped. For example, in a case where the image forming apparatus 20 fails while the print job 131 is executed by the print processing unit 202, the execution of the print job 131 is stopped.

When receiving the notification of the job state (interrupted), the job managing unit 109 of the service providing system 10 stores, in the job storage unit 130 in step S1207, the print job 131 obtained in the above step S1204 in association with the job state "interrupted". In this way, the fact that the print job 131 is interrupted is managed.

After that, in a case of receiving, from another image forming apparatus 20, a request for executing the interrupted print job 131 (print job 131 whose job state is "interrupted"), for example, the service providing system 10 executes the above steps S1202 to S1205. Thus, in a case where the execution of the print job 131 is interrupted due to occurrence of a paper jam, run out of paper, or the like, for example, the user can use the other image forming apparatus 20 to execute the same print job 131. Similarly, in a case where the execution of the print job 131 is interrupted due to failure of the image forming apparatus 20, for example, the user can use another image forming apparatus 20 to execute the same print job 131.

On the other hand, in a case where the execution of the print job 131 in the above step S1205 is normally finished, the print processing unit 202 transmits, to the service providing system 10 in step S1208, a notification (notification of the job state "executed") that represents that the execution of the print job 131 is normally finished.

When receiving the notification of the job state (executed), the job managing unit 109 of the service providing system 10 stores, in the job storage unit 130 in step S1209, the print job 131 obtained in the above step S1204 in association with the job state "executed". In this way, the fact that the print job 131 is normally finished is managed.

Here, the job managing unit 109 of the service providing system 10 deletes, from the job storage unit 130, the print job(s) 131 whose job state is "executed" at a predetermined timing, for example. The job managing unit 109 may delete, from the job storage unit 130, the print job(s) 131 whose job state is "executed" at regular time intervals.

Although the job state "unexecuted", "in executing", "interrupted", or "executed" is associated with the print job 131 stored in the job storage unit 130 in the first embodiment, the embodiment is not limited to this. For example, information relating to a printing completion page may be associated with the print job 131 stored in the job storage unit 130. That is, in the above step S1205, the print processing unit 202 of the image forming apparatus 20 may notify the service providing system 10 of information relating to a printing completion page every time one page of the print data is printed, for example. Here, the printing completion page may be a page number of the printed print data.

Thus, for example, in a case where another image forming apparatus 20 executes the print job 131 whose job state is "interrupted", the job managing unit 109 transmits (returns) the interrupted print job 131 and the information relating to the printing completion page. Thereby, the print processing unit 202 of the other image forming apparatus 20 can restart the printing. That is, at this time, the print processing unit 202 of the other image forming apparatus 20 can print the print data from the next page of the printing completion page. In other words, when receiving the interrupted print job and the page information relating to the printed page associated with the interrupted print job from the job managing unit 109, the print processing unit 202 executes the interrupted print job to print the print data from the next page of the printed page that the page information represents.

As described above, according to the information processing system 1 of the first embodiment, the temporary data can be input in the image forming apparatus 20 to obtain and execute the print job accumulated in the service providing system 10. Thus, according to the information processing system 1 of the first embodiment, it becomes possible to perform printing by the cloud printing service in a desired image forming apparatus 20.

Therefore, according to the information processing system 1 of the first embodiment, it becomes possible to perform printing relating to the cloud printing service in the desired image forming apparatus 20. Further, according to the information processing system 1 of the first embodiment, even when the image forming apparatus 20 is replaced due to failure or the like, for example, it is possible to perform printing without re-registering, in the external printing system 40, the image forming apparatus 20 after the replacement.

Second Embodiment

Next, a second embodiment will be described. According to the second embodiment, a print job 131 to be executed can be selected from print jobs 131 that are associated with the user who logs in from the image forming apparatus 20. Because the second embodiment has a part similar to the first embodiment, descriptions of the second embodiment are omitted as appropriate.

<Details of Processing>
<<Processing of Executing Printing>>

Processing in which the user logs in to the service providing system 10 from the image forming apparatus 20, and selects a print job to be executed from print jobs associated with the user to execute the printing will be described. According to the second embodiment, the print jobs 131 stored in the job storage unit 130 are also associated with the user ID of the user of the terminal apparatus 30 that transmits a print request.

Figure 13:
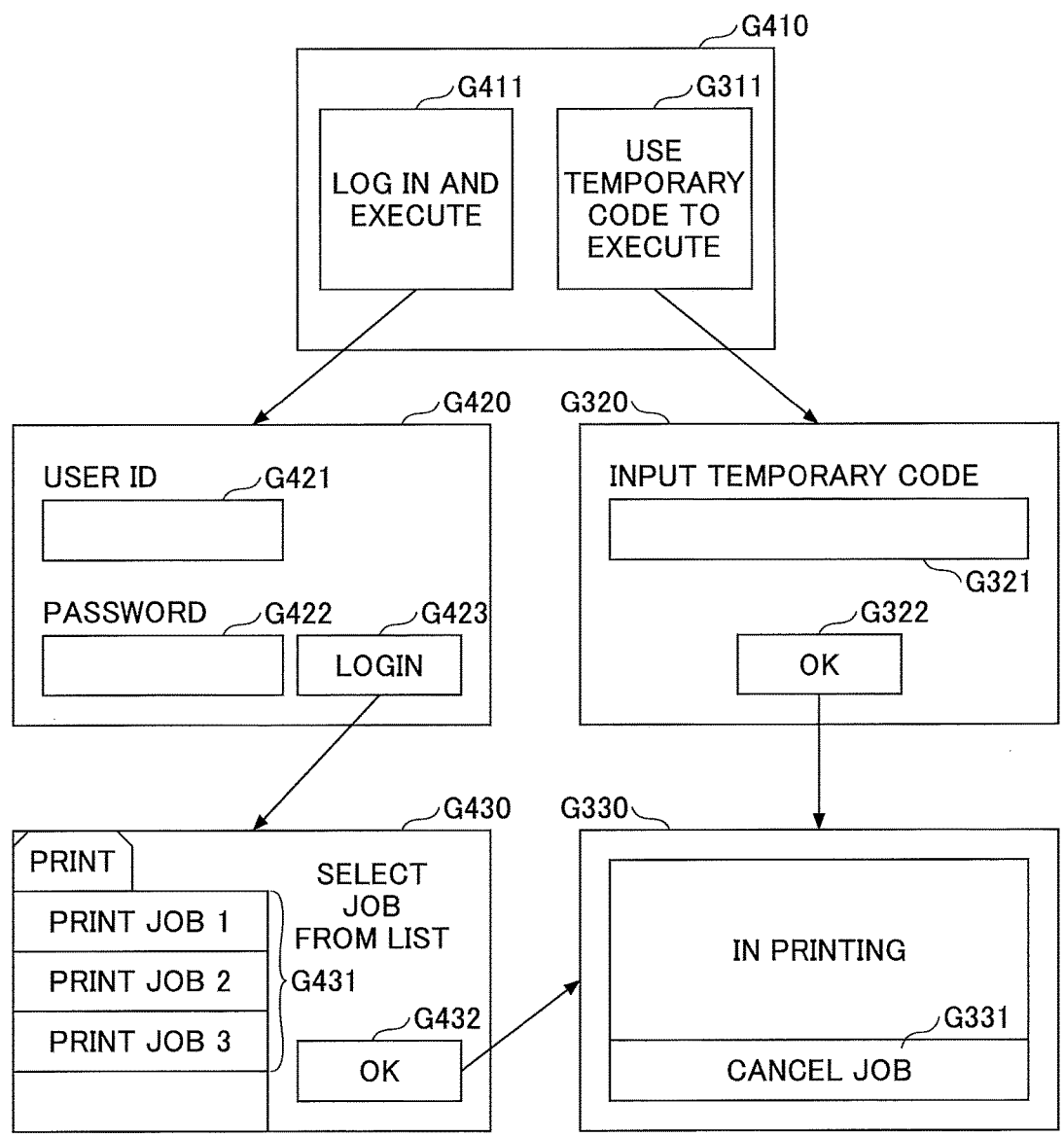
FIG. 13 is a screen transition diagram of an example of the image forming apparatus in processing of executing printing according to a second embodiment.

A screen transition on the operation panel 22 of the image forming apparatus 20 in the processing of executing the printing according to the second embodiment will be described with reference to FIG. 13. FIG. 13 is a screen transition diagram of an example of the image forming apparatus 20 in the processing of executing the printing according to the second embodiment.

As illustrated in FIG. 13, a top screen G410 includes (displays) the execution button G311 for executing the job by use of the temporary code and an execution button G411 for executing the job by logging in. In a case where the execution button G311 for executing the job by use of the temporary code is pushed by the user in the top screen G410, the processing of executing the printing described in the first embodiment is performed.

On the other hand, when the execution button G411 for executing the job by logging in is pushed in the top screen G410, the UI control unit 201 displays a user authentication screen G420.

Figure 14:
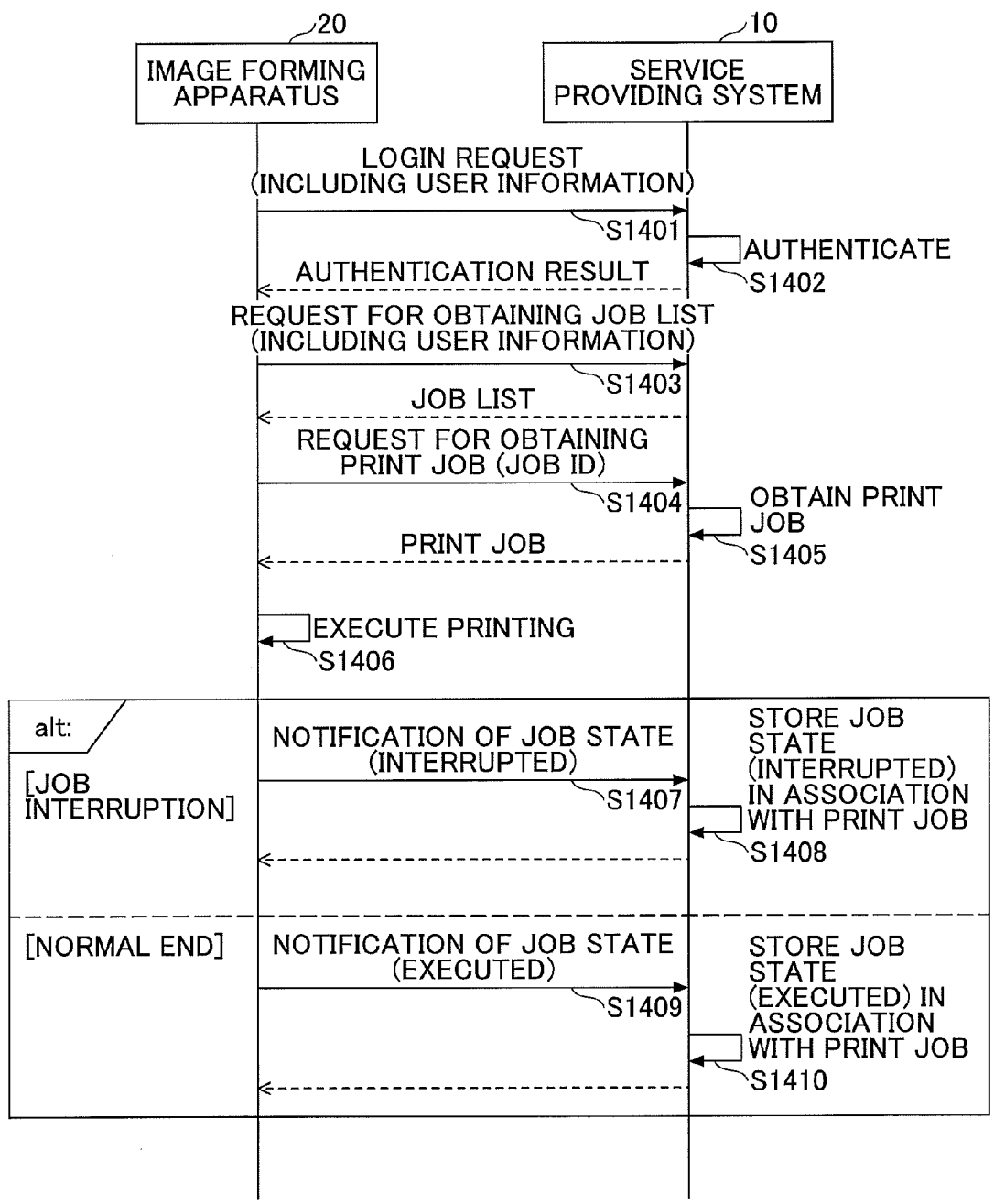
FIG. 14 is a sequence chart illustrating an example of the processing of executing the printing according to the second embodiment.

Then, when a login button G423 is pushed after a user ID and a password are respectively input in a user ID input field G421 and a password input field G422 in the user authentication screen G420, the UI control unit 201 starts to execute a sequence (processing) illustrated in FIG. 14. FIG. 14 is a sequence chart illustrating an example of the processing of executing the printing according to the second embodiment.

The UI control unit 201 of the image forming apparatus 20 transmits a login request to the service providing system 10 in step S1401. Here, the login request includes the user ID and the password entered in the user ID input field G421 and the password input field G422. That is, the login request includes user information.

When receiving the login request, the authenticating unit 101 of the service providing system 10 performs authentication processing in step S1402 based on the user information included in the received login request. Then, the authenticating unit 101 transmits (returns) a processing result of the authentication processing to the image forming apparatus 20.

In a case of receiving a processing result representing that the authentication is successful, the UI control unit 201 of the image forming apparatus 20 transmits, to the service providing system 10 in step S1403, an obtaining request for obtaining the job list. Here, the transmitted obtaining request includes the user information.

When receiving the request for obtaining the job list, the job managing unit 109 of the service providing system 10 transmits (returns), to the image forming apparatus 20, a list of print jobs (job list) associated with the user ID included in the received obtaining request. As described above, the job list includes a job ID and a job name of each print job, for example.

When receiving the job list, the image forming apparatus 20 causes the UI control unit 201 to display a job selection screen G430. The job selection screen G430 includes a job list G431 of the print jobs associated with the user ID of the user who has logged in. When an OK button G432 is pushed after a print job is selected from the job list G431 by the user, the UI control unit 201 displays a screen G330 in printing and processing subsequent to step S1404 is executed.

The UI control unit 201 of the image forming apparatus 20 transmits, to the service providing system 10 in step S1404, an obtaining request for obtaining the print job selected by the user. Here, the transmitted obtaining request includes the job ID of the print job selected by the user.

When receiving the request for obtaining the print job, the job managing unit 109 of the service providing system 10 obtains, from the job storage unit 130 in step S1405, the print job 131 whose job ID is included in the received obtaining request. Then, the job managing unit 109 transmits (returns) the obtained print job 131 to the image forming apparatus 20.

When receiving the print job 131, the print processing unit 202 of the image forming apparatus 20 executes the received print job 131 to print print data included in the received print job 131 in step S1406. Thus, the print job is executed in the image forming apparatus 20 and the print data is printed.

Here, in a case where the execution of the print job 131 in the above step S1406 is stopped (interrupted), the print processing unit 202 transmits, to the service providing system 10 in step S1407, the notification of the job state (interrupted).

When receiving the notification of the job state (interrupted), the job managing unit 109 of the service providing system 10 stores, in the job storage unit 130 in step S1408, the print job 131 obtained in the above step S1405 in association with the job state (interrupted). In this way, the fact that the print job 131 is interrupted is managed.

On the other hand, in a case where the execution of the print job 131 in the above step S1406 is normally finished, the print processing unit 202 transmits, to the service providing system 10 in step S1409, the notification of the job state (executed).

When receiving the notification of the job state (executed), the job managing unit 109 of the service providing system 10 stores, in the job storage unit 130 in step S1410, the print job 131 obtained in the above step S1405 in association with the job state "executed". In this way, the fact that the print job 131 is normally finished is managed.

As described above, according to the information processing system 1 of the second embodiment, a print job, selected from the print jobs associated with the user who has logged in to the service providing system 10 from the image forming apparatus 20, can be obtained to execute the obtained print job. Thus, according to the information processing system 1 of the second embodiment, the user can use a desired image forming apparatus 20 to execute a desired print job to perform printing.

Third Embodiment

Next, a third embodiment will be described. According to the third embodiment, using the image forming apparatus 20, the user selects a desired cloud printing service from at least one cloud printing service. Thereby, use registration for using the cloud cooperation print is performed. Because the third embodiment has a part similar to the first embodiment, descriptions of the third embodiment are omitted as appropriate.

In the following, when the plurality of cloud printing services are discriminated from each other, the cloud printing services are referred to as a "cloud printing service A (or service A)", a "cloud printing service B (or service B)", and the like.

<Details of Processing>
<<Processing of Use Registration>>

Figure 15:
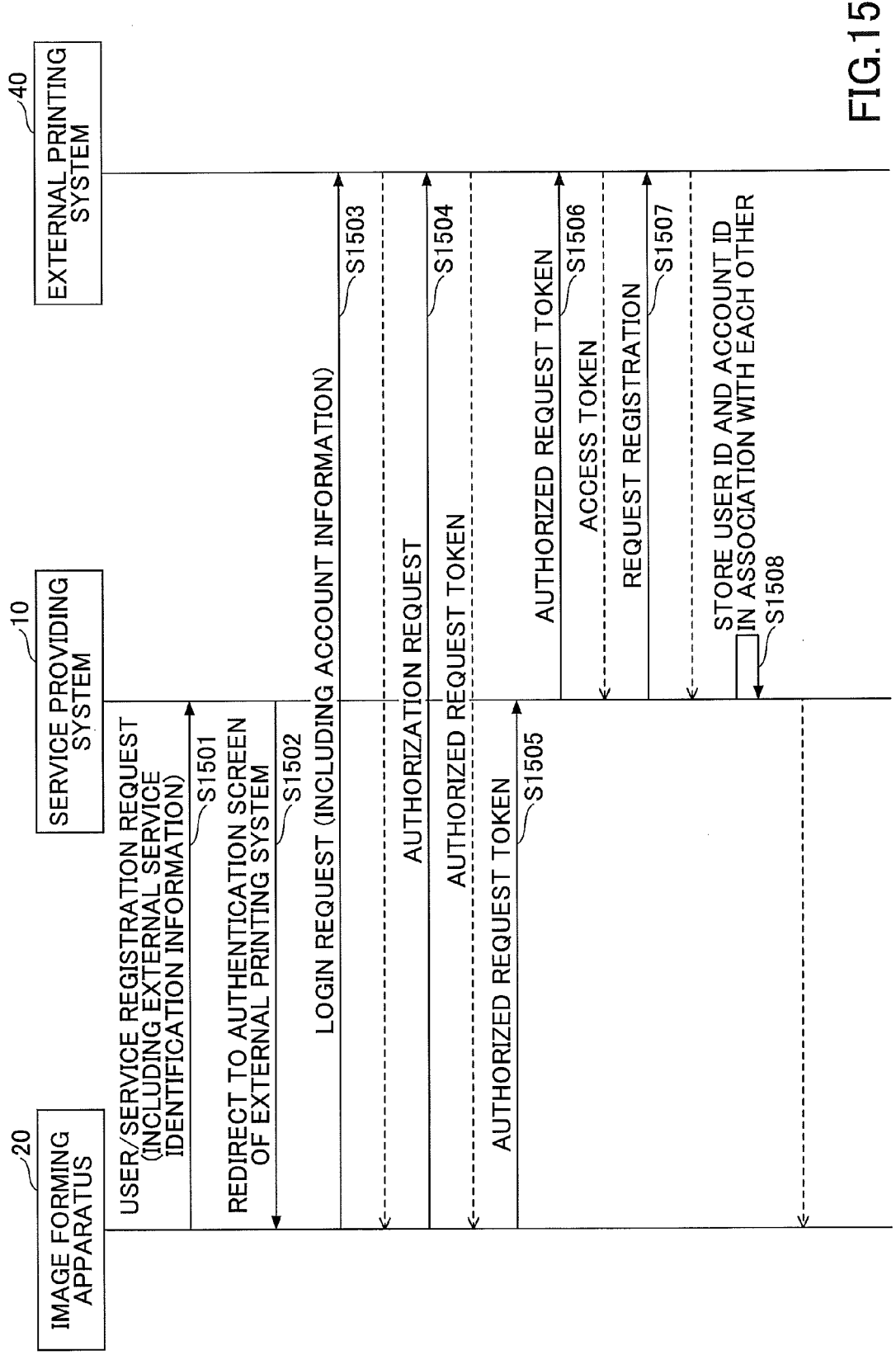
FIG. 15 is a sequence chart illustrating an example of processing of use registration according to a third embodiment.

Processing of use registration in which the user uses the image forming apparatus 20 and performs use registration for using the cloud cooperation printing will be described with reference to FIG. 15. FIG. 15 is a sequence chart illustrating an example of processing of use registration according to the third embodiment. Here, it is assumed that the user has obtained the user ID of the service providing system 10 and the account ID of the external printing system 40 in advance. However, the image forming apparatus 20 may be used to newly create the user ID of the service providing system 10.

Figure 16:
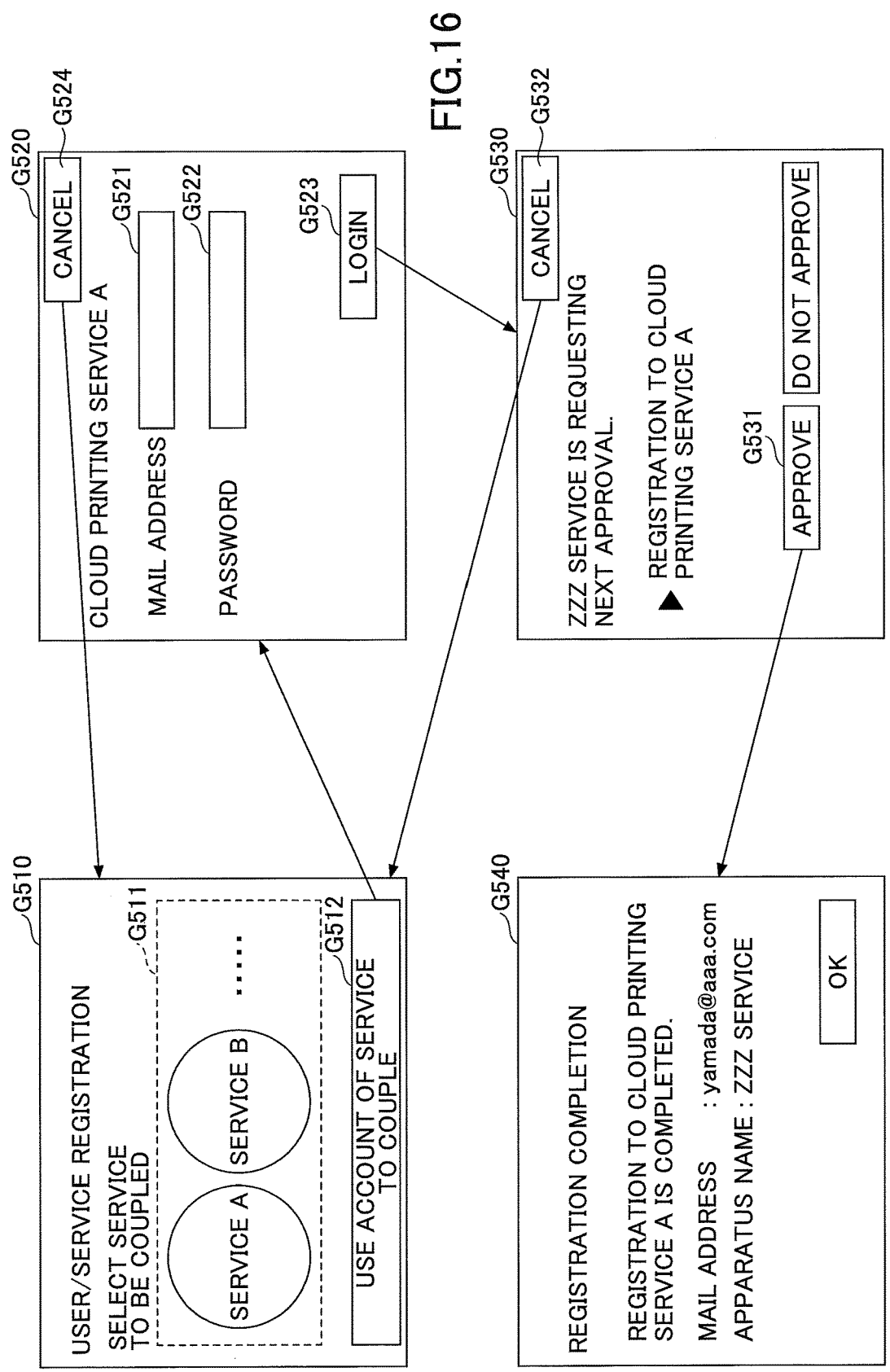
FIG. 16 is a screen transition diagram of an example of the image forming apparatus in the processing of the use registration according to the third embodiment.

FIG. 16 is a screen transition diagram of an example of the image forming apparatus 20 in the processing of the use registration according to the third embodiment. First, a registration start screen G510 is displayed on the image forming apparatus 20 by the UI control unit 201 as illustrated in FIG. 16, for example. The registration start screen G510 illustrated in FIG. 16 includes a service selecting field G511 for selecting a cloud printing service that the user uses, and a coupling button G512 for performing use registration for using the cloud printing service selected in the service selecting field G511.

The user selects a desired cloud printing service from the services in the service selecting field G511, and pushes the coupling button G512. Then, the UI control unit 201 transmits, to the service providing system 10 in step S1501, a registration request for registering the user/service. Here, the transmitted registration request includes identification information (external service identification information) for identifying the cloud printing service selected in the service selecting field G511.

When receiving the request for registering the user/service, the authenticating unit 101 of the service providing system 10 transmits, to the image forming apparatus 20, a Uniform Resource Locator (URL) of an authorization screen of the external printing system 40 that provides the cloud printing service that is identified by the external service identification information included in the received request and redirects the image forming apparatus 20 in step S1502. Thus, an authentication screen G520 of the external printing system 40 is displayed on the image forming apparatus 20 by the UI control unit 201 as illustrated in FIG. 16, for example. In the following, it is assumed that the external printing system 40 is an external printing system 40 that provides the cloud printing service selected by the user from the services in the service selecting field G511.

It is assumed that, in the authentication screen G520 of the external printing system 40 illustrated in FIG. 16, the user pushes a login button G523 after inputting an account ID and a password in an account ID input field G521 and a password input field G522 respectively. Then, the UI control unit 201 transmits a login request to the external printing system 40 in step S1503. Here, the transmitted login request includes the account ID (e-mail address) and the password entered in the account ID input field G521 and the password input field G522. That is, the login request includes account information.

Then, the authentication processing is performed based on the login request in the external printing system 40. In a case where a processing result of the authentication processing is successful, the external printing system 40 causes the image forming apparatus 20 to display an authorization confirmation screen G530 as illustrated in FIG. 16, for example.

Here, in a case where a cancel button G524 is pushed by the user in the authentication screen G520 of the external printing system 40 illustrated in FIG. 16, the UI control unit 201 of the image forming apparatus 20 displays the registration start screen G510 (that is, returns to the registration start screen G510).

When an authorization button G531 is pushed in the authorization confirmation screen G530 illustrated in FIG. 16, the UI control unit 201 transmits an authorization request to the external printing system 40 in step S1504. Then, the external printing system 40 transmits (returns) the authorized request token to the image forming apparatus 20.

Here, in a case where a cancel button G532 is pushed by the user in the authorization confirmation screen G530 illustrated in FIG. 16, the UI control unit 201 of the image forming apparatus 20 displays the registration start screen G510 (that is, returns to the registration start screen G510).

When receiving the authorized request token form the external printing system 40, the UI control unit 201 of the image forming apparatus 20 transmits the received authorized request token to the service providing system 10 in step S1505.

When receiving the authorized request token, the authorizing unit 102 of the service providing system 10 transmits the received authorized request token to the external printing system 40 in step S1506. Then, the external printing system 40 transmits (returns) an access token to the service providing system 10. At this time, when there is no user ID cooperating with the account ID of the external printing system 40, the registering unit 103 of the service providing system 10 generates a new user ID based on the authentication information obtained from the access token. Then, the registering unit 103 causes the cooperation information table 121 to store the generated user ID. In this way, the authorization processing is completed so that the service providing system 10 performs, on the external printing system 40, the registration for using the cloud printing service which.

The registering unit 103 of the service providing system 10 uses the access token obtained in step S1506 to perform the registration for using the cloud printing service in step S1507.

Next, the registering unit 103 of the service providing system 10 causes the cooperation information table 121 to store the user ID and the account ID in association with each other in step S1508. That is, for example, the registering unit 103 stores, in the cooperation information table 121, the newly created user ID and the account ID, input in the account ID input field G521 of the authentication screen G520 of the external printing system 40, in association with each other. Then, the service providing system 10 causes the image forming apparatus 20 to display a registration completion screen G540 illustrated in FIG. 16, for example.

As described above, the use registration is completed so that the user can use the cloud cooperation printing that is provided by the service providing system 10 according to the third embodiment. At this time, according to the service providing system 10 of the third embodiment, using the image forming apparatus 20, after selecting a desired cloud printing service from one or more cloud printing services, the user can perform use registration for using the cloud cooperation service.

<<Processing of Executing Printing>>

Processing in which, after selecting a desired cloud printing service from one or more cloud printing services, the user logs in to the service providing system 10 from the image forming apparatus 20 to execute the printing will be described. According to the third embodiment, a user can select, from print jobs 131 associated with the selected cloud printing service and the user, a print job 131 to be executed.

According to the third embodiment, it is assumed that print jobs 131 stored in the job storage unit 130 are associated with the user ID of the user of the terminal apparatus 30 that transmits the print request and with the external service identification information on the cloud printing service that creates the print jobs 131.

Figure 17:
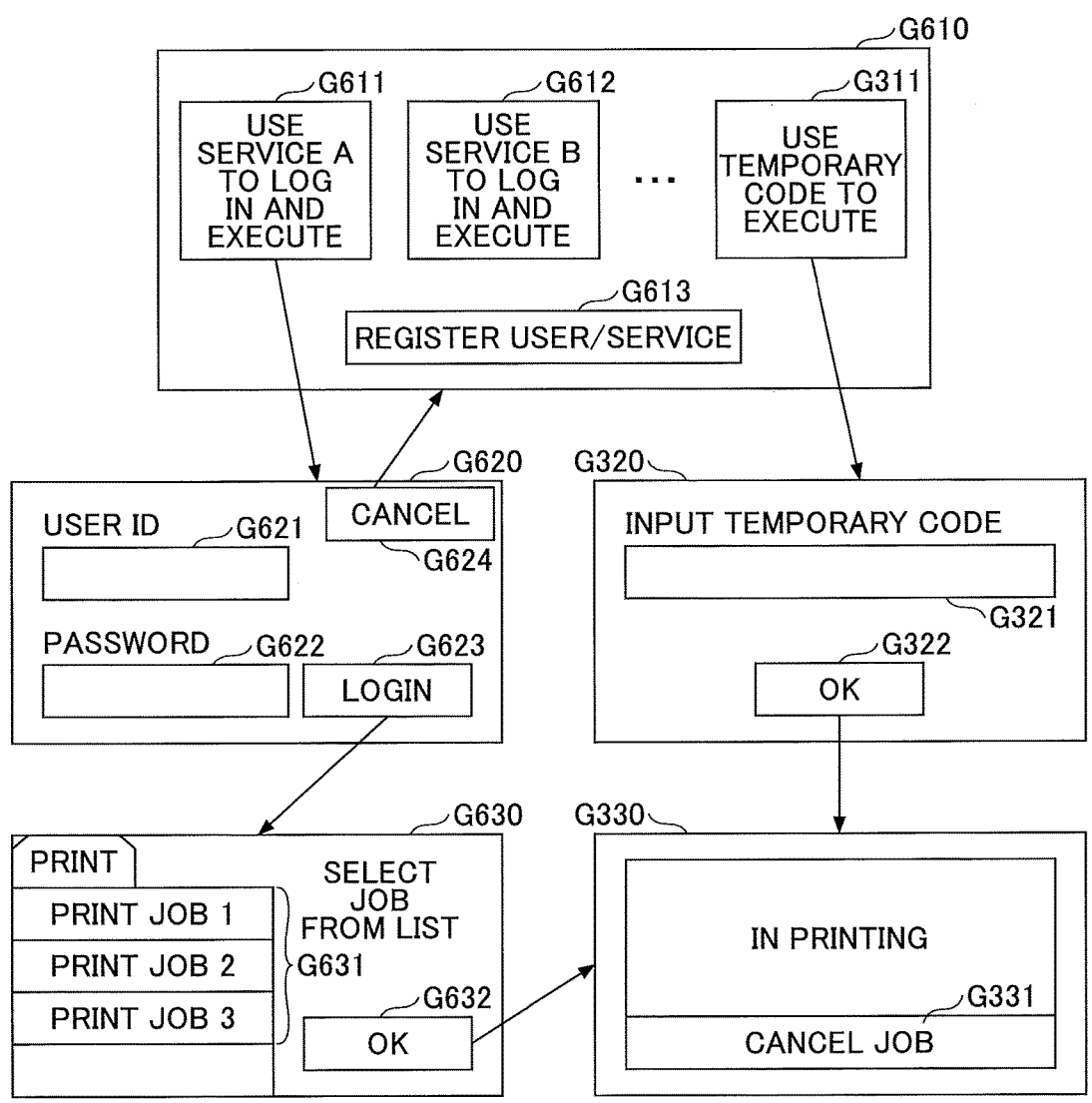
FIG. 17 is a screen transition diagram of an example of the image forming apparatus in processing of executing printing according to the third embodiment.

A screen transition on the operation panel 22 of the image forming apparatus 20 in the processing of executing the printing according to the third embodiment will be described with reference to FIG. 17. FIG. 17 is a screen transition diagram of an example of the image forming apparatus 20 in the processing of executing the printing according to the third embodiment.

As illustrated in FIG. 17, a top screen G610 includes the execution button G311 for executing the job by use of the temporary code, and an execution button G611 for executing the job by using the service A to log in. The service A is for executing the print job 131 created by the cloud printing service A. Further, the top screen G610 includes an execution button G612 for executing the job by using the service B to log in. The service B is for executing the print job 131 created by the cloud printing service B. The top screen G610 further includes a user/service registration button G613.

In addition these buttons, the top screen G610 may include an execution button for each cloud printing service, provided by the external printing system, such as "an execution button for executing a job by using a service C to log in" and "an execution button for executing a job by using a service D to log in", for example.

In a case where the execution button G311 for executing the job by use of the temporary code is pushed by the user in the top screen G610, the processing of executing the printing described in the first embodiment is performed.

On the other hand, in a case where the execution button G611, for executing the job by using the service A to log in, or the execution button G612, for executing the job by using the service B to log in, is pushed in the top screen G610, the UI control unit 201 displays a user authentication screen G620. In the following descriptions, it is assumed that the execution button G611, for executing the job by using the service A to log in, is pushed. Here, in a case where the user/service registration button G613 is pushed, the UI control unit 201 displays the registration start screen G510 illustrated in FIG. 16.

Figure 18:
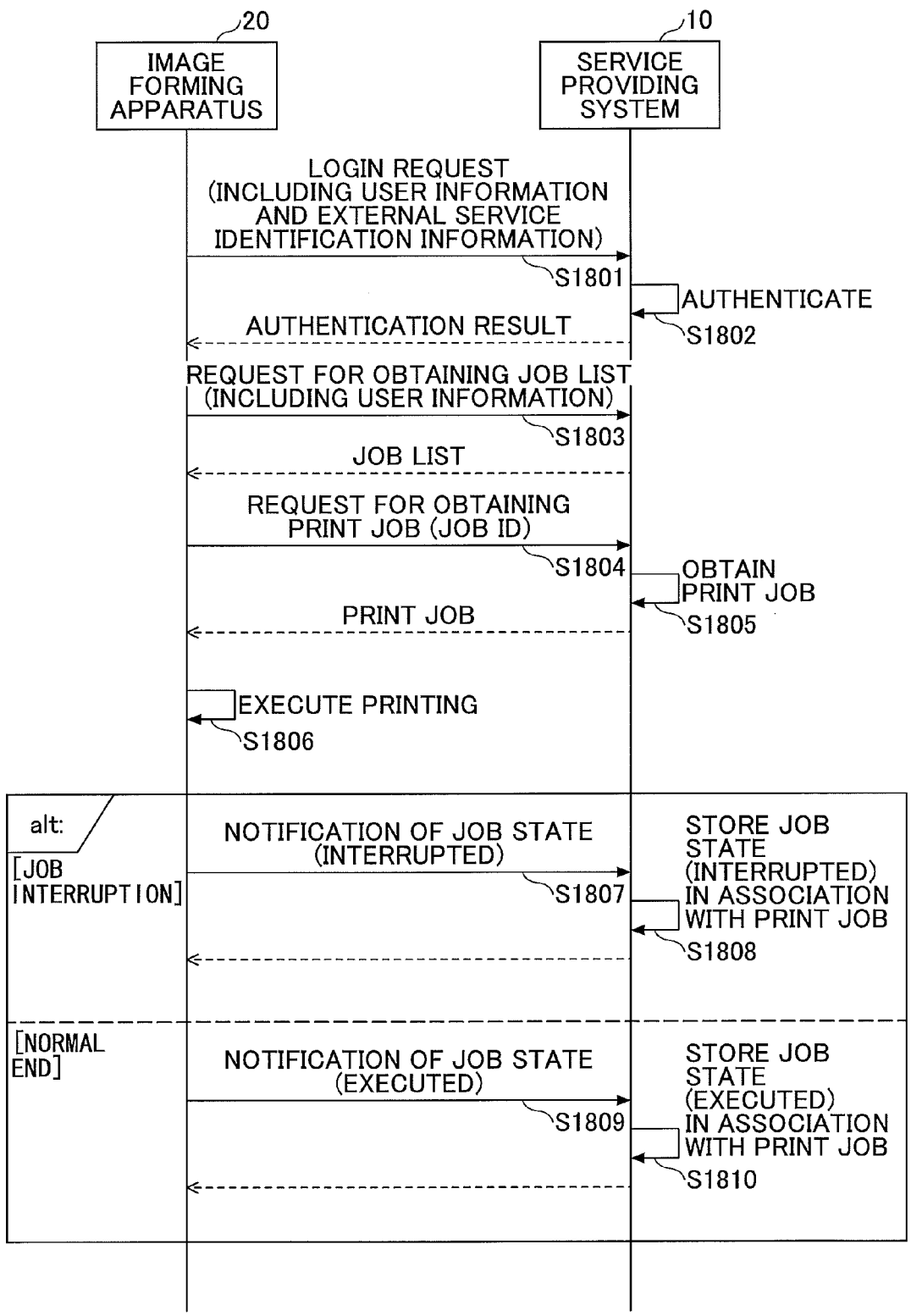
FIG. 18 is a sequence chart illustrating an example of the processing of executing the printing according to the third embodiment.

When a login button G623 is pushed after a user ID and a password are respectively input in a user ID input field G621 and a password input field G622 in the user authentication screen G620, the UI control unit 201 starts to execute a sequence (processing) illustrated in FIG. 18. FIG. 18 is a sequence chart illustrating an example of the processing of executing the printing according to the third embodiment.

The UI control unit 201 of the image forming apparatus 20 transmits a login request to the service providing system 10 in step S1801. Here, the login request includes the user ID and the password entered in the user ID input field G621 and the password input field G622. That is, the login request includes user information. The login request also includes external service identification information on the cloud printing service A.

When receiving the login request, the authenticating unit 101 of the service providing system 10 performs authentication processing based on the user information included in the received login request in step S1802. Then, the authenticating unit 101 transmits (returns) a processing result of the authentication processing to the image forming apparatus 20.

In a case of receiving a processing result representing that the authentication is successful, the UI control unit 201 of the image forming apparatus 20 transmits, to the service providing system 10 in step S1803, an obtaining request for obtaining the job list. Here, the transmitted obtaining request includes the user information.

When receiving the request for obtaining the job list, the job managing unit 109 of the service providing system 10 transmits (returns), to the image forming apparatus 20, the list of print jobs (job list) associated with the user ID included in the received obtaining request and with the external service identification information included in the login request received in the above step S1801. Here, the job list includes a job ID and a job name of each print job, for example.

When receiving the job list, the image forming apparatus 20 causes the UI control unit 201 to display a job selection screen G630. The job selection screen G630 includes a job list G631 of the print jobs associated with the user ID of the user who has logged in and with the external service identification information on the cloud printing service A. When an OK button G632 is pushed after a print job is selected from the print jobs of the job list G631 by the user, the UI control unit 201 displays the screen G330 in printing and processing subsequent to step S1804 is executed. Because processing in steps S1804 to S1810 is similar to the processing in steps S1404 to S1410 of FIG. 14, descriptions of the processing in steps S1804 to S1810 are omitted.

As described above, according to the information processing system 1 of the third embodiment, a print job, selected from the print jobs associated with a user who has logged in to the service providing system 10 and associated with a cloud printing service that the user selects, can be obtained to execute the obtained print job. Thus, according to the information processing system 1 of the third embodiment, the user can use a desired image forming apparatus 20 to execute a desired print job of a desired cloud printing service to perform printing.

Fourth Embodiment

Next, a fourth embodiment will be described. In addition to the cloud printing service, other services such as a storage service and an e-mail service may also be provided as cloud services, for example. In such a case, the other services such as the storage service and the e-mail service may be authorized in the authorization confirmation screen G130 illustrated in FIG. 8, for example.

In the fourth embodiment, a case will be described as an example in which the user uses a service (e-mail service) that transmits image data, generated by using the image forming apparatus 20 to scan one or more documents, by e-mail. Because the fourth embodiment has a part similar to the third embodiment, descriptions of the fourth embodiment are omitted as appropriate.

<Functional Configuration>

Figure 19:
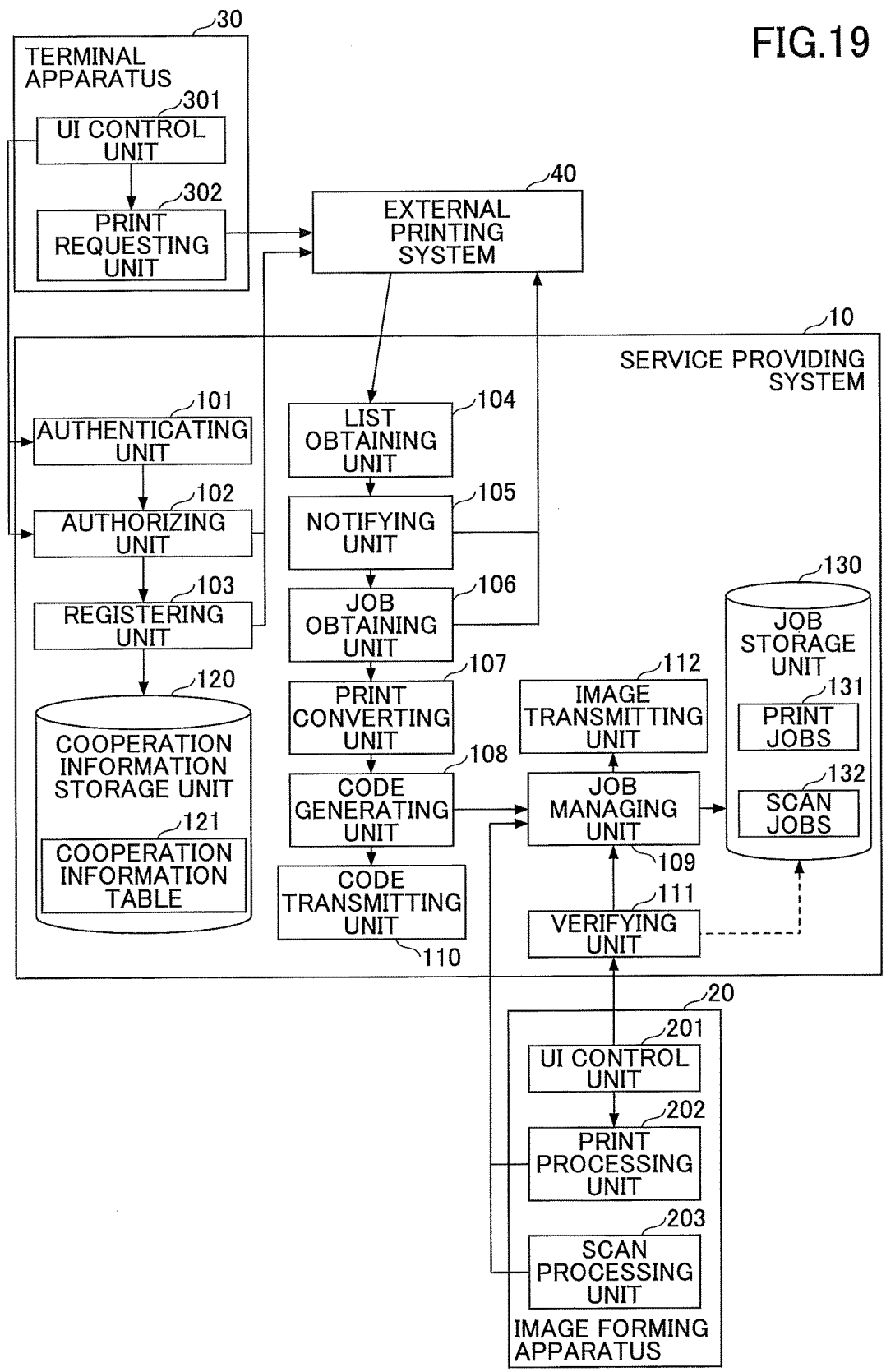
FIG. 19 is a block diagram illustrating an example of a functional configuration of an information processing system according to a fourth embodiment.

A functional configuration of the information processing system 1 according to the fourth embodiment will be described with reference to FIG. 19. FIG. 19 is a block diagram illustrating an example of the functional configuration of the information processing system 1 according to the fourth embodiment.

The image forming apparatus 20 includes a scan processing unit 203. These functional units (elements) are actualized by processing that one or more programs, installed in the image forming apparatus 20, cause the CPU 211 to execute.

The scan processing unit 203 uses the scanner 26 to scan one or more documents to generate image data based on parameters (a setup of reading resolution and a setup of an output file format, for example) included in a scan job 132 obtained from the service providing system 10.

The service providing system 10 includes an image transmitting unit 112. The image transmitting unit 112 is actualized by processing that one or more programs, installed in the service providing system 10, cause the CPU 16 to execute.

The image transmitting unit 112 transmits the image data, generated by the image forming apparatus 20 scanning one or more documents, to a user of a user ID associated with an account ID included in the scan job 132 by e-mail, for example. Further, the image transmitting unit 112 uploads the image data, generated by the image forming apparatus 20 scanning the documents, to a storage designated in the scan job 132, for example.

The scan jobs 132, which are associated with the user ID and with the external service identification information, are stored in the job storage unit 130 of the service providing system 10. For example, the scan job 132 may be created by the job managing unit 109 in advance for each external service identification information and user ID. The scan job(s) 132 may be obtained from the external printing system 40, which provides a service using a scan.

<Details of Processing>
<<Processing of Executing Scan>>

A case in which the cloud printing service A also provides "e-mail service" will be described. The user logs in to the service providing system 10 from the image forming apparatus 20, performs processing of executing a scan, and uses the e-mail service.

Figure 20:
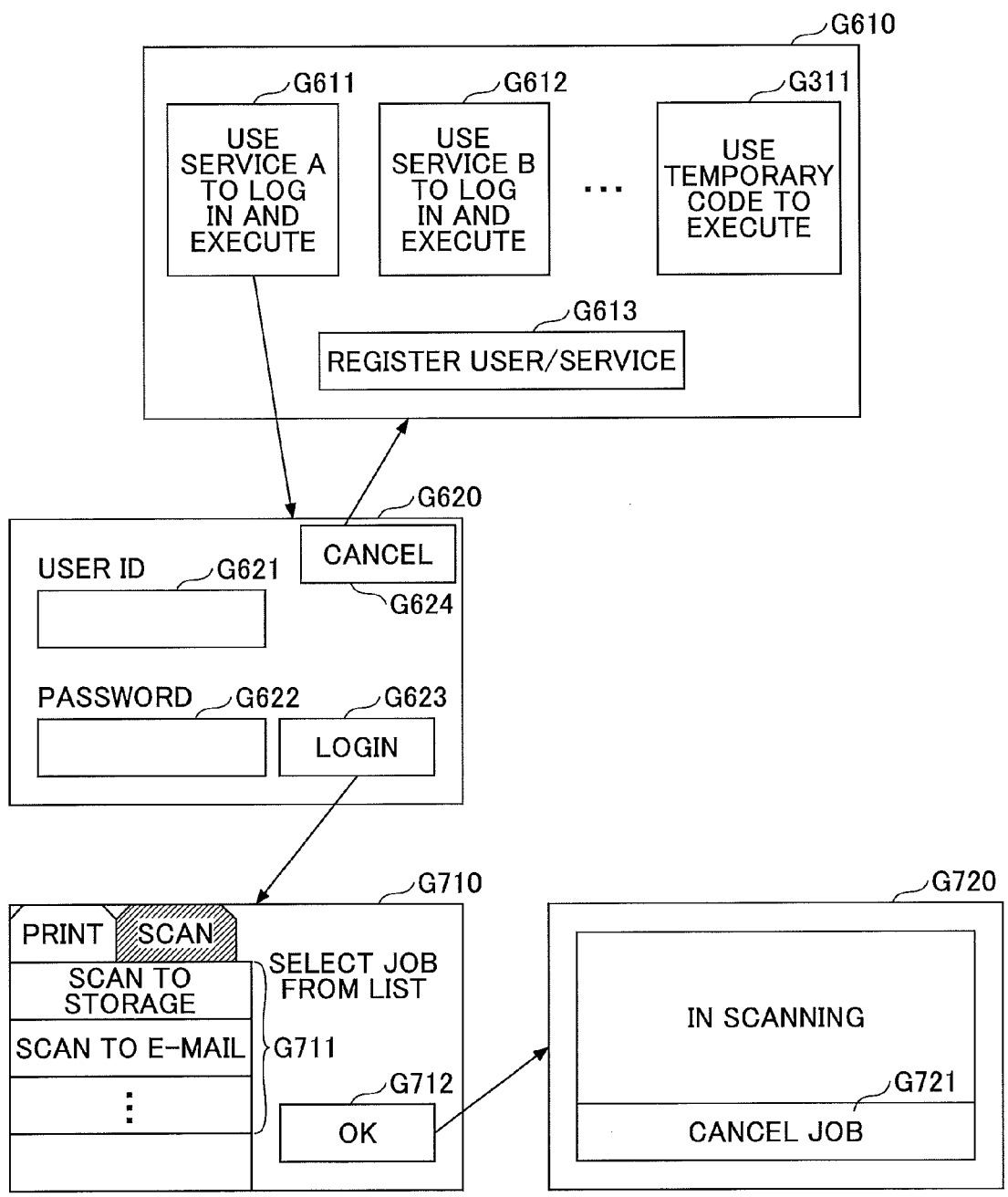
FIG. 20 is a screen transition diagram of an example of the image forming apparatus in processing of executing a scan according to the fourth embodiment.

A screen transition on the operation panel 22 of the image forming apparatus 20 in the processing of executing the scan will be described with reference to FIG. 20. FIG. 20 is a screen transition diagram of an example the image forming apparatus 20 in the processing of executing the scan according to the fourth embodiment.

The top screen G610 and the user authentication screen G620 illustrated in FIG. 20 are similar to the top screen G610 and the user authentication screen G620 of the third embodiment. In the following descriptions, it is assumed that the execution button G611, for executing the job by using the service A to log in, is pushed in top screen G610.

Figure 21:
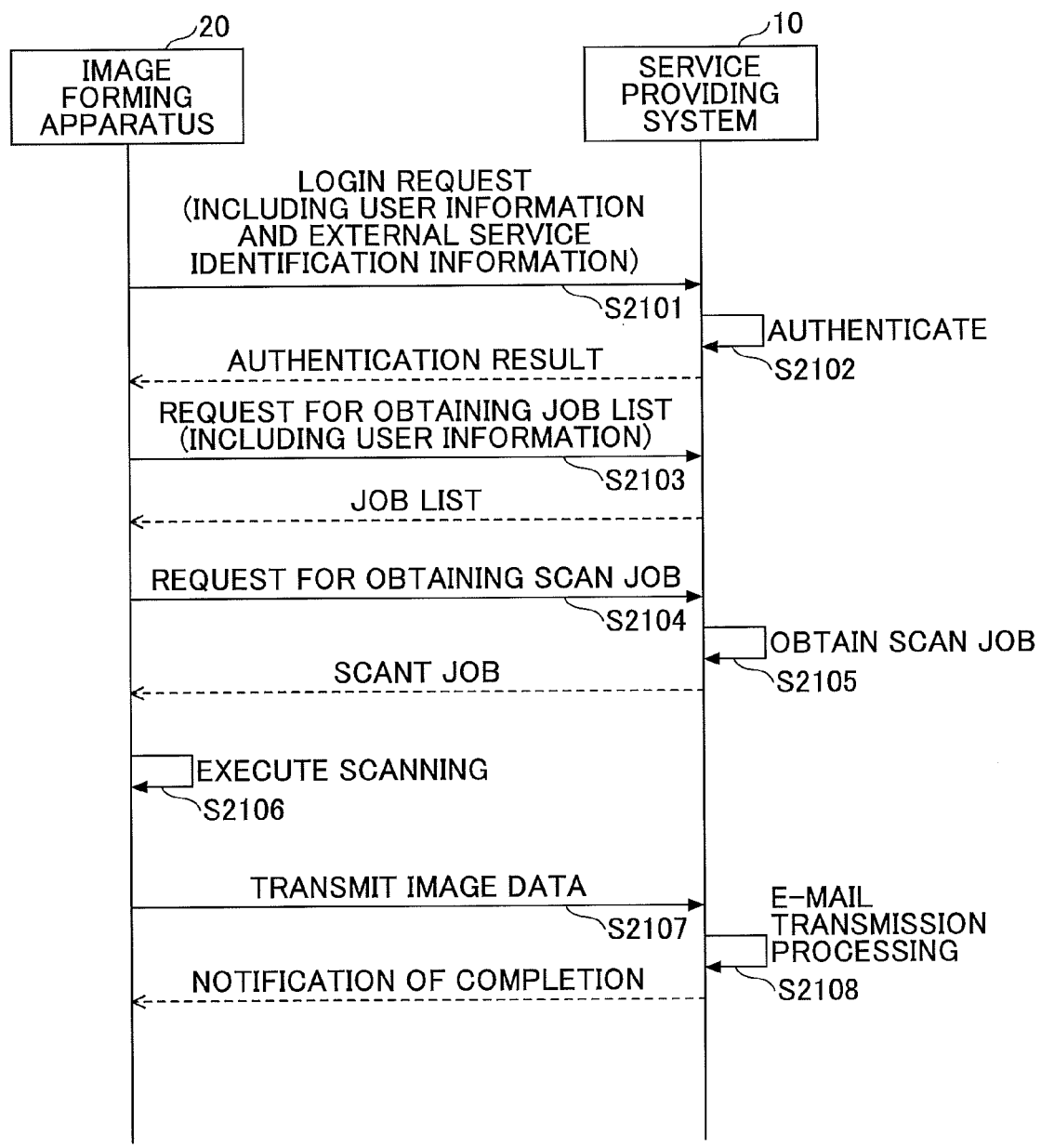
FIG. 21 is a sequence chart illustrating an example of the processing of executing the scan according to the fourth embodiment.

When the login button G623 is pushed after a user ID and a password are respectively input in the user ID input field G621 and the password input field G622, the UI control unit 201 starts to execute a sequence (processing) illustrated in FIG. 21. FIG. 21 is a sequence chart illustrating an example of the processing of executing the scan according to the fourth embodiment.

The UI control unit 201 of the image forming apparatus 20 transmits a login request to the service providing system 10 in step S2101. Here, the login request includes the user ID and the password entered in the user ID input field G621 and the password input field G622. That is, the login request includes user information. The login request also includes external service identification information on the cloud printing service A.

When receiving the login request, the authenticating unit 101 of the service providing system 10 performs authentication processing based on the user information included in the received login request in step S2102. Then, the authenticating unit 101 transmits (returns) a processing result of the authentication processing to the image forming apparatus 20.

In a case of receiving a processing result representing that the authentication is successful, the UI control unit 201 of the image forming apparatus 20 transmits, to the service providing system 10 in step S2103, an obtaining request for obtaining a job list. Here, the transmitted obtaining request includes the user information.

When receiving the request for obtaining the job list, the job managing unit 109 of the service providing system 10 transmits (returns), to the image forming apparatus 20, a list of scan jobs (job list) associated with the user ID included in the received obtaining request and with the external service identification information included in the login request received in the above step S2102. Here, the job list includes a job ID and a job name of each scan job 132, for example.

When receiving the job list, the image forming apparatus 20 causes the UI control unit 201 to display a job selection screen G710 illustrated in FIG. 20. The job selection screen G710 illustrated in FIG. 20 includes a job list G711 of the scan jobs associated with the user ID of the user who has logged in and with the external service identification information on the cloud printing service A. When an OK button G712 is pushed after a scan job is selected from the job list G711 by the user, the UI control unit 201 displays a screen G720 in scanning as illustrated in FIG. 20 and processing subsequent to step S2104 is executed. When a cancel button G721 is pushed in the screen G720 in scanning, the processing of executing the scan is cancelled.

The UI control unit 201 of the image forming apparatus 20 transmits, to the service providing system 10 in step S2104, an obtaining request for obtaining the scan job selected by the user. Here, the transmitted obtaining request includes the job ID of the scan job selected by the user.

When receiving the request for obtaining the scan job, the job managing unit 109 of the service providing system 10 obtains, from the job storage unit 130 in step S2105, the scan job 132 whose job ID is included in the received obtaining request. Then, the job managing unit 109 transmits (returns) the obtained scan job 132 to the image forming apparatus 20. In other words, the job managing unit 109 transmits, to the image forming apparatus 20 that is the request source, the scan job that is associated with the user information, included in the scan job request, and with the identification information on the service that provides the scan service.

When receiving the scan job 132, the scan processing unit 203 of the image forming apparatus 20 executes the received scan job 132 in step S2106. That is, based on the parameters included in the received scan job 132, the scan processing unit 203 uses the scanner 26 to scan one or more documents to generate image data.

Next, the scan processing unit 203 of the image forming apparatus 20 transmits, to the service providing system 10 in step S2107, the image data generated by executing the scan job 132.

When the job managing unit 109 receives the image data, the image transmitting unit 112 of the service providing system 10 creates e-mail to which the received image data is attached. Then, the image transmitting unit 112 transmits in step S2108 the created e-mail to the user of the user ID associated with the account ID included in the scan job 132 obtained in step S2105. Here, the e-mail address of the user, which is the transmission destination, may be managed, in a predetermined data table or the like stored in the service providing system 10, in association with the user ID, for example. However, the scan job 132 may include the e-mail address of the transmission destination.

In this way, the image data, generated by scanning at the image forming apparatus 20, is transmitted by e-mail. Here, the image transmitting unit 112 may upload the image data, received from the image forming apparatus 20, to a storage included in the scan job 132 obtained in step S2105.

As described above, according to the information processing system 1 of the fourth embodiment, using the image forming apparatus 20, the user can similarly use other services such as a storage service and an e-mail service, for example, in addition to the cloud printing service.

It should be noted that the above described system according to the embodiments may be realized by a device memory, which stores at least one program, and at least one processor, which executes the at least one program to execute processing for providing a service as described in the embodiments. In other words, the service providing system 10 may be realized by the device memory and the at least one processor, for example. For example, the device memory and the at least one processor can implement functions as described in the embodiments and may be implemented by hardware elements as described in the embodiments. The at least one program may be stored in a non-transitory recording medium.

The order of the method of the present disclosure is not limited to the order of processes of the method disclosed in the above described embodiments.

The present disclosure can be implemented in any convenient form, for example using dedicated hardware, or a mixture of dedicated hardware and software. The present disclosure may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Because the present disclosure can be implemented as software, each and every aspect of the present disclosure thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. For example, the CPU may be implemented by one or more processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Further, the present disclosure is not limited to these embodiments, but various variations and modifications may be made without departing from the scope of the present invention.

What is claimed is:

1. A service providing system for providing a service that is in cooperation with a printing service that is provided by an external printing system to cause an image forming apparatus to execute printing, the external printing system being configured to receive a print request from a terminal apparatus to create a print job, the service providing system, the image forming apparatus, and the external printing system being structured by respective different apparatuses, the image forming apparatus and the service providing system being coupled to each other via a network and arranged at different locations, the service providing system and the external printing system being coupled to each other via the network and arranged at different locations, the service providing system comprising:
   a memory; and
   a processor that is coupled to the memory and that is configured to
   receive from the external printing system a notification representing that the print job is created by the printing service based on the print request from the terminal apparatus, the print request including data to be printed, the print job being created in the external printing system;
   upon receiving from the external printing system the notification, obtain the print job from the external printing system via the network;
   store, in the memory, the print job obtained;
   receive a print job request from the image forming apparatus; and
   transmit, to the image forming apparatus, the print job stored in the memory in response to receiving the print job request from the image forming apparatus, to cause the image forming apparatus to print the data included in the print job on a sheet.

2. The service providing system according to claim 1, wherein the processor is configured to
   generate unique code information,
   store, in the memory, the obtained print job in association with the code information generated, and
   transmit the print job, stored in the memory in association with the code information, in response to the print job request designating the code information from the image forming apparatus.

3. The service providing system according to claim 2, wherein the processor is configured to
   verify validity of the code information designated by the print job request, and
   transmit the print job, stored in the memory in association with the code information, in a case where a verification result represents that the code information designated by the print job request is valid.

4. The service providing system according to claim 2, wherein the processor is configured to
   transmit, to an e-mail address designated in advance, the code information generated.

5. The service providing system according to claim 1, wherein the processor is configured to
   upon receiving the notification, obtain a job list that represents a list of print jobs, and
   obtain, from the external printing system, at least one unexecuted print job listed in the job list obtained.

6. The service providing system according to claim 1, wherein, upon receiving an execution state of the print job from the image forming apparatus, the processor is configured to store, in the memory, the execution state in association with the print job.

7. The service providing system according to claim 6, wherein the processor is configured to transmit at least one print job of print jobs stored in the memory, the job execution state of the at least one print job being either an unexecuted state that represents the print job is unexecuted, or an interrupted state that represents execution of the print job is interrupted.

8. The service providing system according to claim 1,
   wherein, upon receiving from the image forming apparatus page information representing a printed page of print data included in the print job, the processor is configured to store, in the memory, the page information in association with the print job, and
   wherein the processor is configured to transmit the print job, stored in the memory, and the page information, stored in the memory in association with the print job, in response to the print job request from the image forming apparatus.

9. The service providing system according to claim 1,
   wherein the memory stores account information for using the printing service and user information, which is issued by the service providing system, in association with each other; and
   wherein the processor is configured, in response to a use request from the terminal apparatus or the image foiuiing apparatus that is coupled to the service providing system via the network, to store, in the memory, the user information, included in the use request, and the account information, input in a screen displayed on the terminal apparatus or the image forming apparatus by the printing service, in association with each other.

10. The service providing system according to claim 9, wherein the processor is configured to transmit, in response to the print job request from the image forming apparatus, the print job of the printing service that is able to be used by the account information stored in the memory in association with the user information included in the print job request.

11. The service providing system according to claim 9,
   wherein the printing service further provides a scan service,
   wherein the memory stores a scan job, created by the scan service, in association with the user information and identification information on the printing service, and
   wherein the processor is configured to transmit, in response to a scan job request from the image forming apparatus, the scan job, stored in association with the user information included in the scan job request and with the identification information on the printing service, to the image forming apparatus that is a request source.

12. The service providing system according to claim 1, wherein the processor is configured to
   generate code information,
   store, in the memory, the print job in association with the code information, and transmit the code information to a user apparatus the terminal apparatus, wherein the print job request is transmitted, from the image forming apparatus to the service providing system, upon the code information being input by a user on a screen displayed on the image forming apparatus.

13. The service providing system according to claim 1, wherein the processor is configured to display on the image forming apparatus a list of print jobs associated with a user who logs into the service providing system from the image forming apparatus, and transmit a print job, selected by the user from the print jobs included in the list, to the image forming apparatus to cause the image forming apparatus to print data included in the print job selected by the user.

14. The service providing system according to claim 1, wherein the print job is not created in the service providing system but created in the external printing system.

15. The service providing system according to claim 1, wherein the processor is configured to register user identification information in advance, and transmit the user identification information to the external printing system to obtain the print job corresponding to the user identification information from the external printing system, the user identification information being information for identifying a user in the external printing system.

16. The service providing system according to claim 1, wherein, when the image forming apparatus starts to execute the print job, the processor receives, from the image forming apparatus, a job execution notification of a job state that represents that the print job enters an executing sate, and upon receiving the job execution notification, the processor stores the job state in association with the print job so as not to transmit the print job when receiving, from another image forming apparatus, a request for executing the print job.

17. The service providing system according to claim 1, wherein the processor is configured to generate a unique code for executing the print job;

store, in the memory, the print job in association with the unique code;

transmit the unique code to the terminal apparatus; and transmit, to the image forming apparatus, the print job stored in the memory in response to receiving, from the image forming apparatus, the print job request including the unique code input to the image forming apparatus, to cause the image forming apparatus to print the data included in the print job on the sheet, wherein when the print job is stopped before the image forming apparatus normally finishes the print job, the processor receives, from the image forming apparatus, a notification of a job state that represents that the print job is stopped, and wherein upon receiving the notification of the job state, the processor stores the job state in association with the print job so as to allow to transmit the print job when receiving, from another image forming apparatus, a request, including the unique code input to said another image forming apparatus, to cause said image forming apparatus to print the data included in the print job.

18. The service providing system according to claim 17, wherein the print request transmitted from the terminal apparatus to the external printing system does not include information for an image forming apparatus by which the print job is to be executed.

19. An information processing method that is used by a service providing system including a memory and a processor for providing a service that is in cooperation with a printing service that is provided by an external printing system to cause an image forming apparatus to execute printing, the external printing system being configured to receive a print request from a terminal apparatus to create a print job, the service providing system, the image forming apparatus, and the external printing system being structured by respective different apparatuses, the image forming apparatus and the service providing system being coupled to each other via a network and arranged at different locations, the service providing system and the external printing system being coupled to each other via the network and arranged at different locations, the information processing method comprising:

receiving from the external printing system a notification representing that the print job is created by the printing service based on the print request from the terminal apparatus, the print request including data to be printed, the print job being created in the external printing system;

obtaining, upon receiving from the external printing system the notification, the print job from the external printing system via the network;

storing the obtained print job in the memory;

receiving a print job request from the image forming apparatus; and transmitting, to the image forming apparatus, the print job stored in the memory in response to the print job request from the image forming apparatus, to cause the image forming apparatus to print the data included in the print job on a sheet.

20. A non-transitory recording medium storing a program that causes a service providing apparatus including a memory and a processor for providing a service that is in cooperation with a printing service that is provided by an external printing system to execute processing, the external printing system being configured to receive a print request from a terminal apparatus to create a print job, the service providing system, the image forming apparatus, and the external printing system being structured by respective different apparatuses, an image forming apparatus and the service providing apparatus being coupled to each other via a network and arranged at different locations, the service providing system and the external printing system being coupled to each other via the network and arranged at different locations, the processing comprising:

receiving from the external printing system a notification representing that the print job is created by the printing service based on the print request from the terminal apparatus, the print request including data to be printed, the print job being created in the external printing system;

obtaining, upon receiving from the external printing system the notification, the print job from the external printing system via the network;

storing the obtained print job in the memory;

receiving a print job request from the image forming apparatus; and transmitting, to the image forming apparatus, the print job stored in the memory in response to the print job request from the image forming apparatus, to cause the image forming apparatus to print the data included in the print job on a sheet.

* * * * *